(12) United States Patent
Wang

(10) Patent No.: US 8,661,371 B1
(45) Date of Patent: Feb. 25, 2014

(54) METHOD AND APPARATUS FOR FIXING DOUBLE PATTERNING COLOR-SEEDING VIOLATIONS

(71) Applicant: Cadence Design Systems, Inc., San Jose, CA (US)

(72) Inventor: Xiaojun Wang, Cary, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/725,958

(22) Filed: Dec. 21, 2012

(51) Int. Cl.
*G06F 17/50* (2006.01)

(52) U.S. Cl.
USPC .......................................................... 716/52

(58) Field of Classification Search
USPC .......................................................... 716/52
See application file for complete search history.

(56) References Cited

U.S. PATENT DOCUMENTS

| | | | |
|---|---|---|---|
| 6,446,239 B1 * | 9/2002 | Markosian et al. | 716/122 |
| 8,375,348 B1 * | 2/2013 | Raj et al. | 716/126 |
| 8,434,043 B1 * | 4/2013 | Hsu et al. | 716/113 |
| 8,448,100 B1 * | 5/2013 | Lin et al. | 716/54 |
| 2011/0078638 A1 * | 3/2011 | Kahng et al. | 716/52 |
| 2011/0197168 A1 | 8/2011 | Chen et al. | |
| 2011/0219341 A1 | 9/2011 | Cao et al. | |
| 2012/0124536 A1 | 5/2012 | Sharma | |
| 2012/0216157 A1 | 8/2012 | Luo et al. | |
| 2013/0007674 A1 * | 1/2013 | Abou Ghaida et al. | 716/52 |
| 2013/0024822 A1 | 1/2013 | Hsieh et al. | |
| 2013/0061186 A1 * | 3/2013 | Hsu et al. | 716/55 |
| 2013/0074018 A1 | 3/2013 | Hsu et al. | |

\* cited by examiner

*Primary Examiner* — Suresh Memula
(74) *Attorney, Agent, or Firm* — Adeli LLP

(57) ABSTRACT

A method for displaying layout-fixing hints for resolving color-seeding violations in an IC design layout. The method receives a set of error paths within a disjoint set of shapes. For each error path, the method performs an analysis on the error path to identify a set of layout-fixing hints that eliminates the color-seeding violation on the error path and does not introduce any new color-seeding violation. The method displays the set of identified hints for each error path in order to aid a user to resolve the color-seeding violations. The method displays each identified layout-fixing hint as a set of moving instructions. The set of moving instructions provides a set of indications of a distance by which a shape or an edge of the shape needs to be moved in order to resolve a color-seeding violation.

21 Claims, 21 Drawing Sheets

METHOD AND APPARATUS FOR FIXING DOUBLE PATTERNING COLOR-SEEDING VIOLATIONS

BACKGROUND

An integrated circuit ("IC") is a device (e.g., a semiconductor device) or electronic system that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect the IC's electronic and circuit components.

Design engineers design ICs by transforming logical or circuit descriptions of the ICs' components into geometric descriptions, called design layouts. Design layouts typically include (1) circuit modules (i.e., geometric representations of electronic or circuit IC components) with pins and (2) interconnect lines (i.e., geometric representations of wiring) that connect the pins of the circuit modules. In this fashion, design layouts often describe the behavioral, architectural, functional, and structural attributes of the IC. To create design layouts, design engineers typically use electronic design automation ("EDA") applications. These applications provide sets of computer-based tools for creating, editing, analyzing, and verifying design layouts. The applications also render the layouts on a display device or to storage for displaying later.

Fabrication foundries ("fabs") manufacture ICs based on the design layouts using a photolithographic process. Photolithography is an optical printing and fabrication process by which patterns on a photolithographic mask (i.e., "photomask," or "mask") are imaged and defined onto a photosensitive layer coating a substrate. To fabricate an IC, photomasks are created using the IC design layout as a template. The photomasks contain the various geometries or shapes (i.e., features) of the IC design layout. The various geometries or shapes contained on the photomasks correspond to the various base physical IC elements that comprise functional circuit components such as transistors, interconnect wiring, vertical interconnect access (via) pads, as well as other elements that are not functional circuit elements but are used to facilitate, enhance, or track various manufacturing processes. Through sequential use of the various photomasks corresponding to a given IC in an IC fabrication process, a large number of material layers of various shapes and thicknesses with various conductive and insulating properties may be built up to form the overall IC and the circuits within the IC design layout.

As more circuit features are packed into an IC design layout (e.g., manufacturing processes at feature sizes of 14 nm and below), the resolution of the photolithographic process makes it extremely difficult to fabricate the geometries or shapes on a single lithography mask. The difficulty stems from constraining factors in traditional photolithographic processes that limit the effectiveness of current photolithographic processes. Some such constraining factors are the lights/optics used within the photolithographic processing systems. Specifically, the lights/optics are band limited due to physical limitations (e.g., wavelength and aperture) of the photolithographic process. Therefore, the photolithographic process cannot print beyond a certain minimum width of a feature, minimum spacing between features, and other such physical manufacturing constraints.

For a particular layer of the IC fabrication process, the pitch specifies the sum of the width of a feature and the space on one side of the feature separating that feature from a neighboring feature on the same layer. The minimum pitch for a layer is the sum of the minimum feature width and the minimum spacing between features on the same layer. Depending on the photolithographic process at issue, factors such as optics and wavelengths of light or radiation restrict how small the pitch may be made before features can no longer be reliably printed to a wafer or mask. As such, the smallest size of any features that can be created on a layer of an IC is limited by the minimum pitch for the layer.

FIG. 1 illustrates a typical pitch constraint of a photolithographic process. In FIG. 1, a pitch 110 acts to constrain the spacing between printable features 120 and 130 of a design layout. While other photolithographic process factors such as the threshold 140 can be used to narrow the width 150 of the features 120 and 130, such adjustments do not result in increased feature density without adjustments to the pitch 110. As a result, increasing feature densities beyond a certain threshold is infeasible via a pitch constrained single exposure process.

To enhance the feature density, the shapes on a single layer can be manufactured on two different photolithographic masks. This approach is often referred to as "Double Patterning Lithography (DPL)" technology. FIG. 2 illustrates an example of this approach. In FIG. 2, a design layout 205 specifies three features 210-230 that are pitch constrained and thus cannot be photolithographically printed with a conventional single exposure process. Analysis of the characteristics (e.g., the band limitation) of the available photolithographic process and of the design layout 205 results in the decomposition of the design layout 205 into a first exposure 240 for printing features 210 and 230 and a second exposure 250 for printing feature 220. As such, the features 210 and 230 are assigned to a first photomask for printing during the first exposure 240 and feature 220 is assigned to a second photomask for printing during the second exposure 250.

FIG. 3 illustrates a manner of using DPL technology by sending different shapes of a layer to two different masks. Specifically, FIG. 3 illustrates sending five shapes 301-305 of a design layout 300 to two different masks. The shape pairs of the shapes 301 and 302, the shapes 302 and 303, the shapes 303 and 304, and the shapes 304 and 305 are all pitch constrained. Therefore, the two shapes of each pair must be sent to two different masks 310 and 315. Accordingly, the shapes 301 and 303 are sent to a first mask 310. That is, the shapes 301 and 303 are printed during a first exposure in order to produce contours 320. Similarly, the shapes 302, 304, and 305 are sent to a second mask 315. That is, the shapes 302, 304, and 305 are printed during a second exposure in order to produce contours 325. The resulting union of the contours 320 and 325 generates pattern 330 that is sufficient to approximately reproduce the original design layout 300.

To use DPL technology, the layout designers need to follow a set of design rules or constraints while designing the layout such that the shapes on a single design layer can be successfully fabricated using two different masks. Some available EDA tools assign two colors (e.g., red and green) to the shapes to identify the two masks with which the shapes will be fabricated. Each shape on a design layer begins with its color unassigned. The EDA tool assigns one of the two colors to each shape on the layer. Shapes that have been assigned to the same color must be spaced apart by at least a certain minimum distance specified by the design rules. Typically, the required minimum spacing between shapes assigned to the same color is greater than the required minimum spacing between two shapes with different colors because shapes with different colors are fabricated using different masks, bypassing the limitations of the single-exposure photolithographic process. In this application, the required minimum spacing between shapes assigned to the same color is referred to as a minimum same color spacing. The required minimum spacing between two shapes with different colors is referred to as a minimum spacing. Since a pitch specifies the sum of the width of a shape (i.e., feature) and the space on one side of the shape separating that feature from a neighboring shape, a minimum same color spacing is pitch minus the width of the shape in some embodiments. A specific color that is assigned to a particular shape is arbitrary. However, the assignment makes sure that the shapes adjacent to the particular shape that are spaced apart from the particular shape by less than the minimum same color spacing have different colors.

Some EDA tools model each shape in a design layout as a node in a graph. Two nodes are connected when the corresponding shapes are apart from each other at a distance smaller than the minimum same color spacing. After this modeling process, the layout is represented as clusters of graphs in which nodes are connected. Each node in a graph is assigned a color in such a way to make sure that the neighboring nodes have different colors. This is because when the neighboring nodes (e.g., a connected pair of nodes) have the same color, the corresponding shapes would violate a design rule that requires two shapes with the same color are apart from each other at a distance greater than or equal to the minimum same color spacing. However, when the nodes in a graph form a loop and there are an odd number of nodes in such graph, it is not possible to assign different colors to all pairs of nodes of the graph.

FIG. 4 illustrates an example printing error that is materialized on the physical wafer when three shapes 1-3 are sent to two different masks. Specifically, this figure shows a possible pattern 430 resulting from applying the color assignment. As shown, the shapes 1-3 are divided into two sets of shapes 410 and 415 according to the color assignment. That is, the shape 2 is sent to the first of the two masks and the shapes 1 and 3 are sent to the second mask.

Each set of shapes is printed during an exposure of a double exposure photolithographic printing process (e.g., a DPL process). That is, the shape set 410 (i.e., the shape 2) is printed during the first exposure in order to produce contours 420 and the shape set 415 is printed during the second exposure in order to produce contours 425. However, because the shape 1 and the shape 3 were too close (e.g., within the minimum same color spacing) in the pattern 405, the contour for the shape 1 and the contour for shape 2 intersect in this example, resulting in a short. The resulting union of the contours 420 and 425 generates the pattern 430. As shown, the pattern 430 did not meet the specifications within the original design layout represented by the pattern 405 in which shapes 1 and 3 are not meant to connect to each other. A printing error is thus resulted.

Double patterning (DP) is equivalent to use two colors to color the layout shapes such that a pair of shapes must be assigned opposite color if they are pitch constrained. DPL techniques are sometimes affected by the designer's desire to assume partial control of the coloring of the layout because some critical circuits, nets, or cells require control of the coloring to reduce potential randomness in variability that could occur if the foundry arbitrarily colored them. In that case, the designer assumes control over the coloring of some portion of the design, and leaves the rest to the foundry, which then decomposes the rest of the design onto different masks, either manually or with automated assistance. Those shapes that have color pre-assigned by the designer are called color-seeding shapes. Color-seeding technology is adopted to manage mask misalignment variations that could result from manufacturing variations.

The color-seeding technology may cause coloring violations in the design layout. Using color-seeding techniques creates a new challenge for users of the DP technology because they have to detect and fix color-seeding violations while meeting other requirements of DPL techniques, as well as satisfying Design Rule Checking (DRC) and Design For Manufacturability (DFM) requirements.

BRIEF SUMMARY

Some embodiments of the invention provide a method for displaying layout-fixing hints for resolving color-seeding violations in an IC design layout. A layout-fixing hint represents a solution for eliminating a color-seeding violation by breaking one or more links between two shapes. The method of some embodiments receives a set of error paths within a disjoint set of shapes. For each error path, the method of some embodiments performs an analysis on the error path to identify a set of layout-fixing hints that eliminates the color-seeding violation on the error path without introducing any new color-seeding violation. In some embodiments, the method displays the set of identified hints for each error path in order to aid a user to resolve the color-seeding violation. The method of some embodiments displays each identified layout-fixing hint as a set of moving instructions. The set of moving instructions provides a set of indications of a distance by which a shape or an edge of the shape needs to be moved in order to resolve a color-seeding violation.

The method assigns a priority value to each identified layout-fixing hint in some embodiments. The method of some embodiments then sorts the set of identified hints for each error path based on the assigned priority values. In some embodiments, the set of identified layout-fixing hints are displayed in an order resulted from the sorting based on priority values.

In some embodiments, each path between two shapes includes a set of links. Each link connects two shapes within a threshold distance from each other. Any two shapes that are connected by a link are assigned to different masks in order to prevent printing errors. A color-seeding violation exists when there is an odd number of links on a path between two color-seeding shapes that have been assigned with the same color. In addition, a color-seeding violation exists when there is an even number of links on a path between two color-seeding shapes that have been assigned with different colors.

The method of some embodiments identifies a set of holes in shapes and links of a disjoint set that includes a pair of pre-colored shapes. A hole is a space enclosed by a loop formed by shapes and links. In some embodiments, the method performs an analysis to identify layout-fixing hints for an error path based on the set of identified holes. From the set of identified holes, the method of some embodiments retrieves all the holes that interact with at least one shape in the error path. Such holes are referred to as "related" holes. For each link on the error path, the method of some embodiments determines a relationship between the link and the related holes. Based on the relationship, the method of some embodiments determines whether breaking the link is a hint or not.

For instance, breaking the link is a hint when the link does not interact with any of the related holes. In some embodiments, breaking the link is a hint when the link interacts with an error-path hole while not interacting with any non-error-path hole or trivial hole. A related hole is an error-path hole when the related hole interacts with both pre-colored shapes connected by the error path. A related hole is a trivial hole when the related hole interacts with at most two shapes in the disjoint set and is not an error-path hole. A related hole is a non-error-path hole when the related hole is neither an error-path hole nor a trivial hole.

In some embodiments, breaking the link is potentially a part of a multi-link hint when the link interacts with an error-path hole and a trivial hole while not interacting with any non-error-path hole. In order to identify a multi-link hint between two given shapes in the design layout, the method of some embodiments retrieves all links between the two shapes. In some embodiments, the method determines whether there are at least two links between the two shapes. When there are at least two links between the two shapes, the method of some embodiments identifies a multi-link hint when none of the links between the two shapes interacts with a non-error-path hole.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for displaying layout-fixing hints for resolving color-seeding violations in an IC design layout. A layout-fixing hint represents a solution for eliminating a color-seeding violation by breaking one or more links between two shapes. The method of some embodiments receives a set of error paths within a disjoint set of shapes. For each error path, the method of some embodiments performs an analysis on the error path to identify a set of layout-fixing hints that eliminates the color-seeding violation on the error path without introducing any new color-seeding violation. In some embodiments, the method displays the set of identified hints for each error path in order to aid a user to resolve the color-seeding violation. The method of some embodiments displays each identified layout-fixing hint as a set of moving instructions. The set of moving instructions provides a set of indications of a distance by which a shape or an edge of the shape needs to be moved in order to resolve a color-seeding violation.

Figure 1:
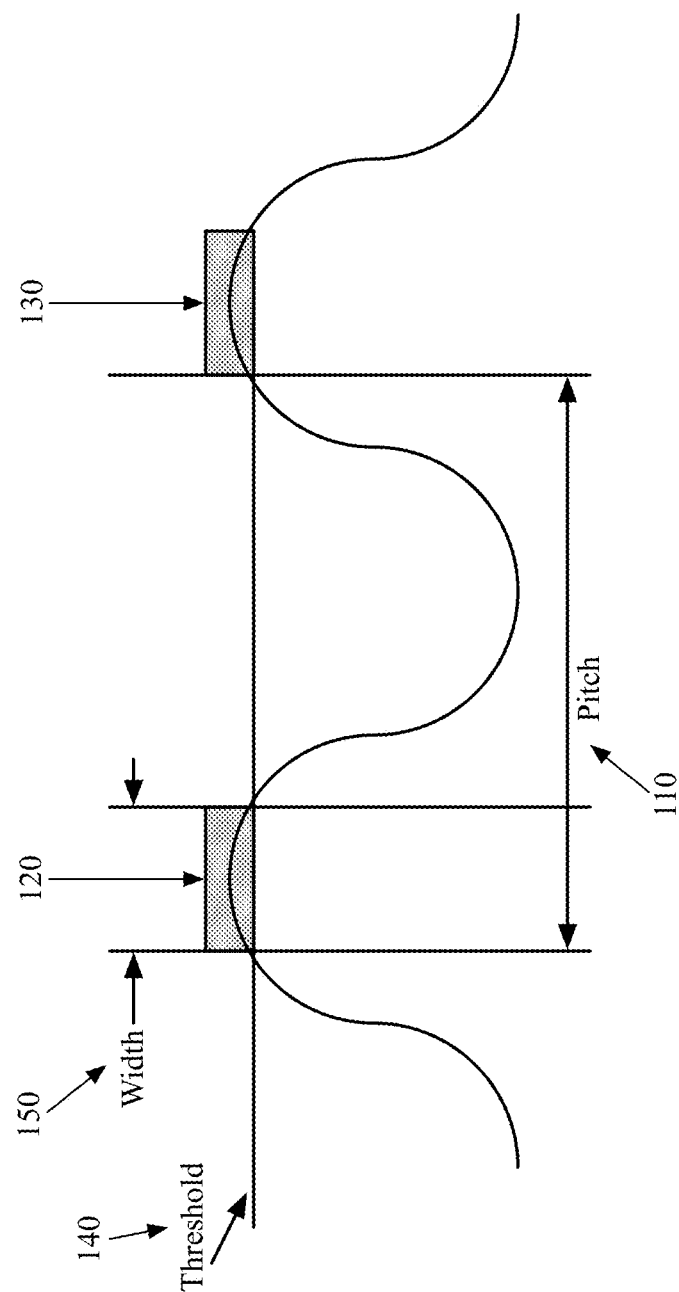
FIG. 1 illustrates a typical pitch constraint of a photolithographic process of some embodiments.
Figure 2:
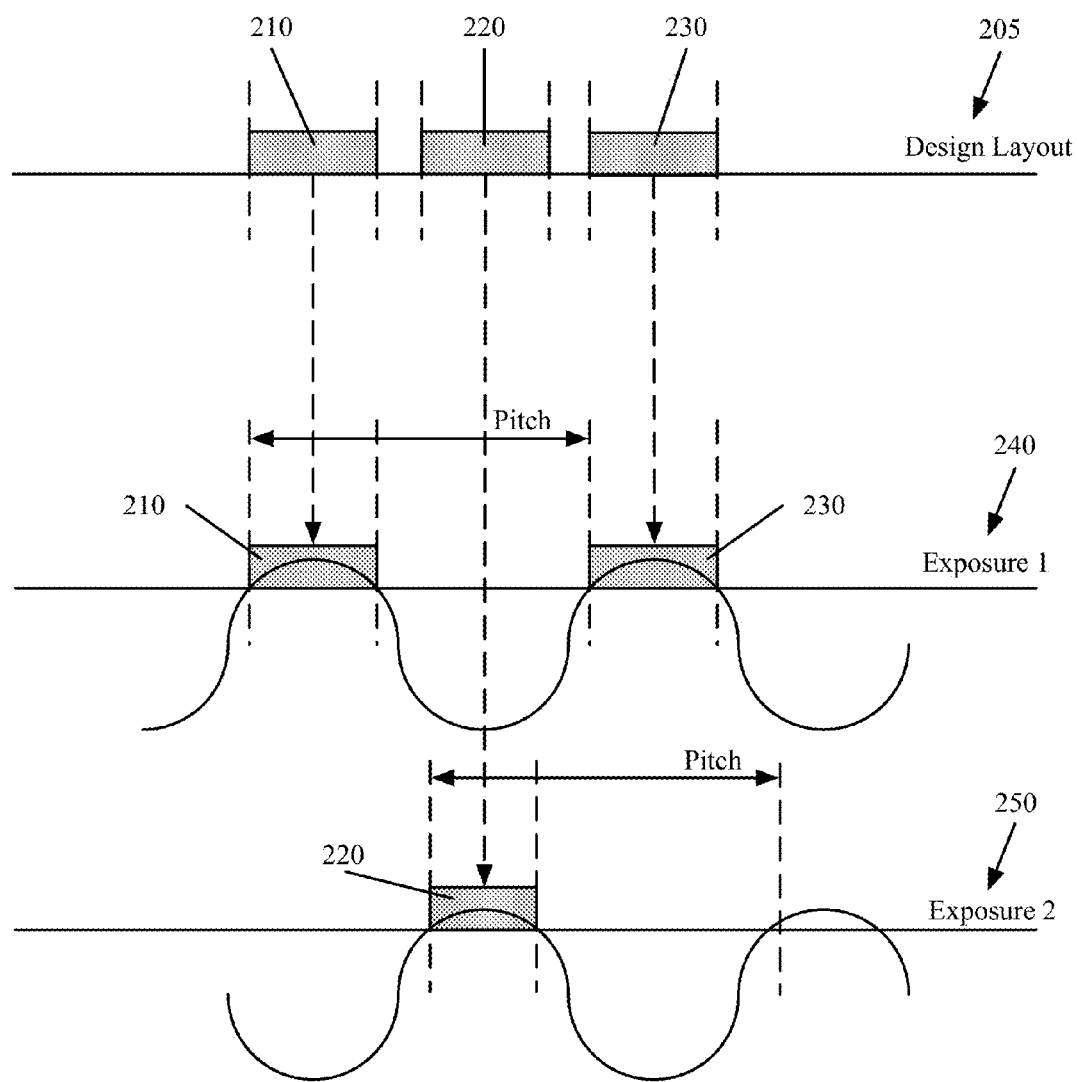
FIG. 2 illustrates an example of a multiple exposure photolithographic process of some embodiments.
Figure 3:
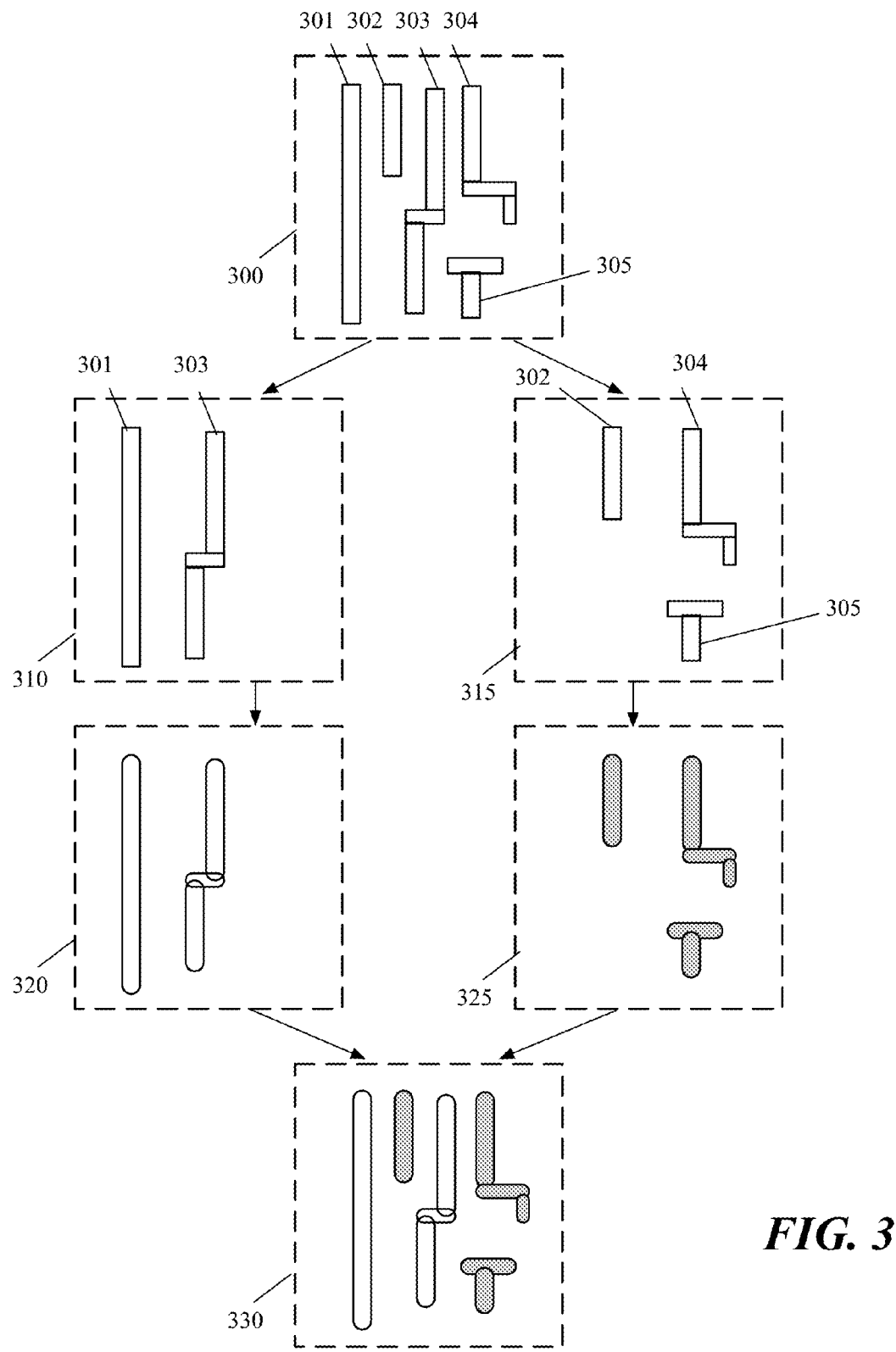
FIG. 3 illustrates an example of Double Patterning Lithography technology.
Figure 4:
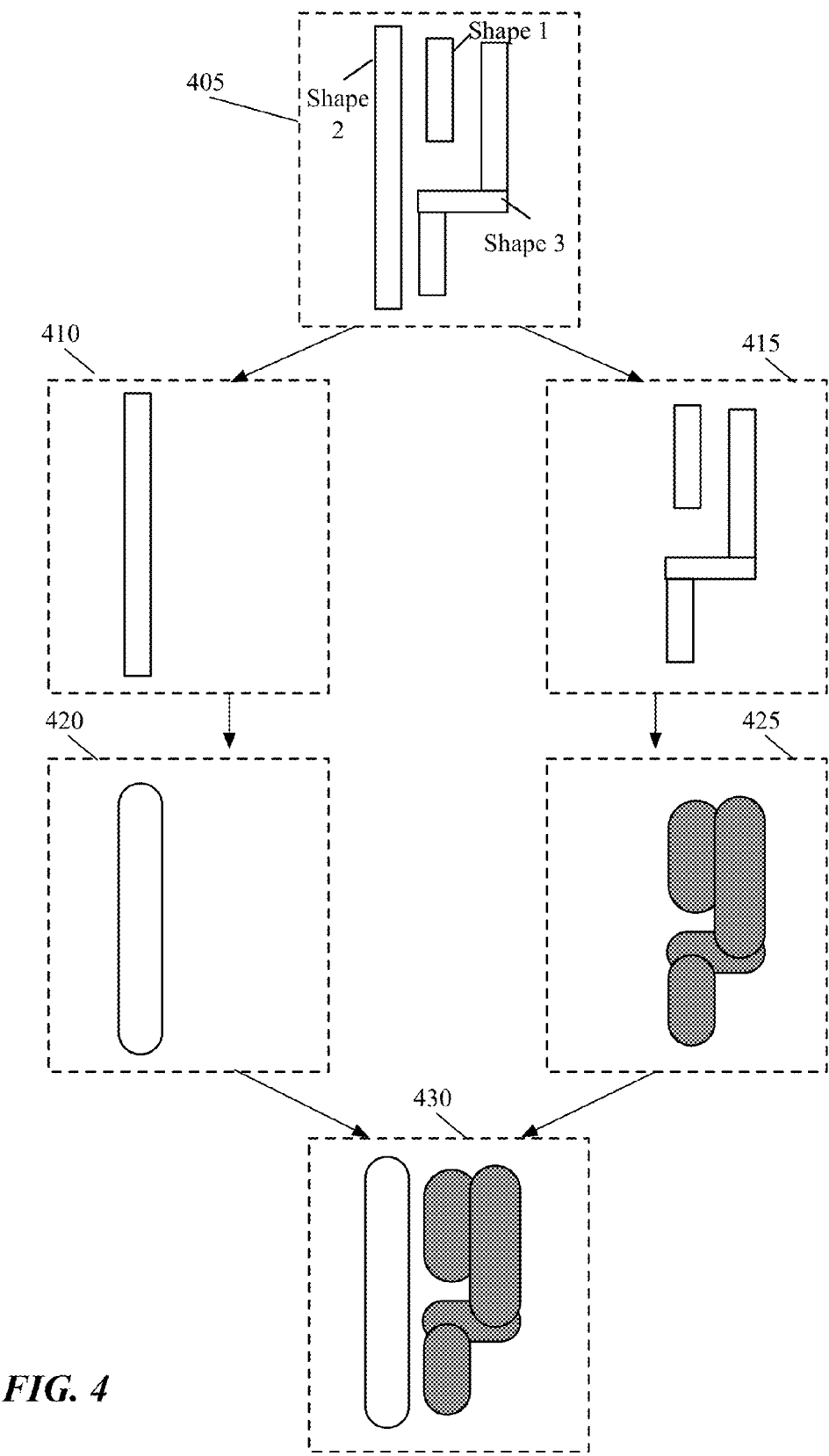
FIG. 4 illustrates an example printing error.
Figure 5:
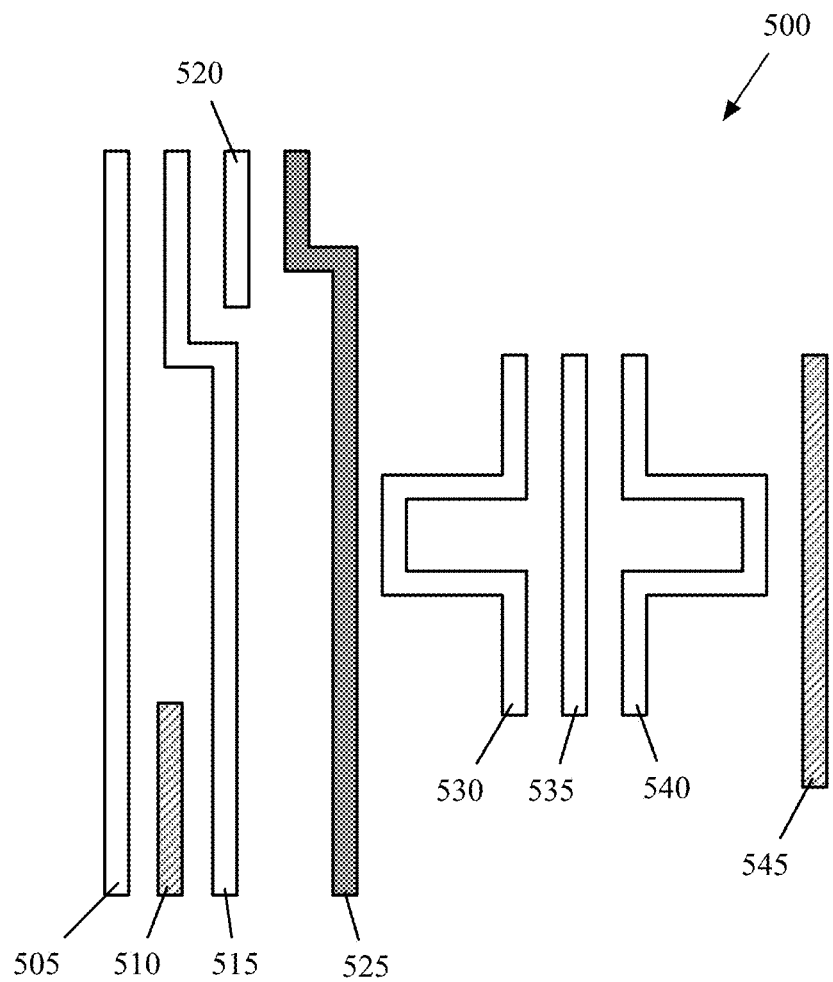
FIG. 5 illustrates an example of a design layout with color-seeding shapes.

FIG. 5 illustrates an example of a design layout with color-seeding shapes. Specifically, the design layout 500 includes nine shape 505-545. The shapes 510 and 545 are pre-assigned with a first color (illustrated in the figure as lined gray) and the shape 525 is pre-assigned with a second color (illustrated in the figure as solid gray). This means the designer has pre-assigned the shapes 510 and 545 to a first mask and the shape 525 to a second different mask. A DP decomposition tool will then be used to assign the rest of the shapes onto one of these two masks. A shape is referred to as a node. In the description that follows, the term "shape" and "node" will be used interchangeably.

Figure 6:
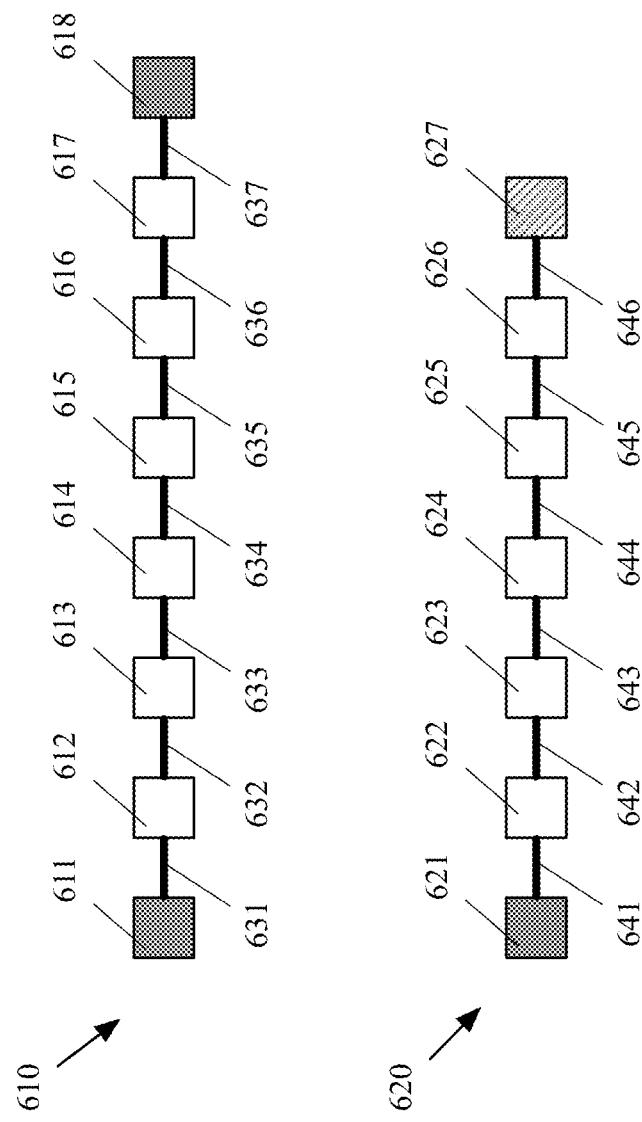
FIG. 6 illustrates two scenarios of color-seeding violations.

The color-seeding technology may cause coloring violations in the design layout. FIG. 6 illustrates two scenarios of color-seeding violations. Specifically, this figure shows two paths 610 and 620. The path 610 includes eight shapes 611-618 connected by seven links 631-637. The path 620 includes seven shapes 621-627 connected by six links 641-646. Each link connects two shapes that are pitch constrained. Therefore, two shapes connected by a link should be assigned different colors in order to prevent printing errors.

The path 610 includes two pre-colored shapes 611 and 618 that are pre-assigned with a first color (illustrated in the figure as solid gray). This means the two shapes are pre-assigned to the same mask. Because the shape 611 is pre-colored with the first color, its neighboring shape 612 should be assigned to a second different color (illustrated in the figure as lined gray). Assuming there are only two masks available for assignment in some embodiments, one is represented by the first color and the other is represented by the second color. The shape 613 should be assigned the first color because it is connected to the shape 612 through the link 632. Similarly, the shapes 615 and 617 should be assigned the first color. Because the shape 618 is connected to the shape 617 through the link 637, the shape 618 should be assigned a color different than the color assigned to the shape 637. Therefore, the shape 618 should be assigned the second color. However, this is in conflict with the pre-assigned color of the shape 618, which is the first color. Therefore, there is a color-seeding violation between the pre-colored shapes 611 and 618. When two seeding shapes pre-assigned with the same color have an odd number of links in between, the method of some embodiments determines that the pair of shapes causes a color-seeding violation. However, when two seeding shapes pre-assigned with the same color have an even number of links in between, the method of some embodiments determines that the pair of shapes does not cause a color-seeding violation.

The path 620 includes two pre-colored shapes 621 and 627. The shape 621 is assigned the first color (illustrated in the figure as solid gray) and the shape 627 is assigned the second color (illustrated in the figure as lined gray). This means the two shapes are pre-assigned to different masks. Because the shape 621 is pre-colored with the first color, its neighboring shape 622 should be assigned to a different color, e.g., the second color. The shape 623 should be assigned the first color because it is connected to the shape 622 through the link 642. Similarly, the shapes 625 and 627 should be assigned the first color. However, this is in conflict with the pre-assigned color of the shape 627, which is the second color. Therefore, there is a color-seeding violation between the pre-colored shapes 621 and 627. When two seeding shapes assigned with different colors have an even number of links in between, the method of some embodiments determines that the pair of shapes causes a color-seeding violation. However, when two seeding shapes assigned with different colors have an odd number of links in between, the method of some embodiments determines that the pair of shapes does not cause a color-seeding violation.

Figure 7:
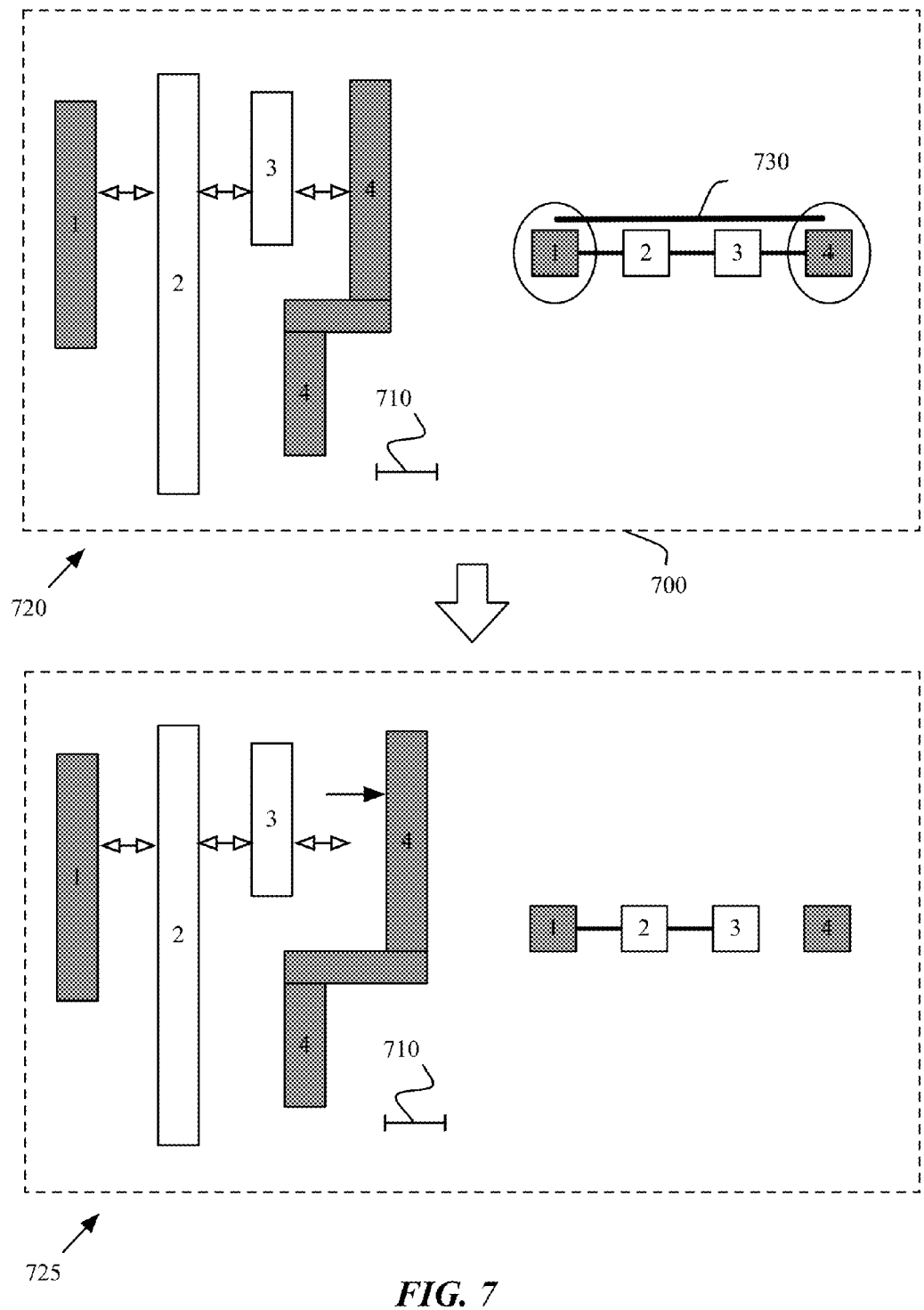
FIG. 7 illustrates an example of breaking a DP color-seeding violation by moving one of the corresponding shapes away from a neighboring shape.

In some embodiments, a DP color-seeding violation can be resolved by breaking the error path between two pre-colored shapes that have a color-seeding violation. The error path breaks when one of the shapes in the path, which is represented by a node in the graph, is moved such that the shape is apart from one of its neighboring shape on the path at a distance greater than the minimum same color spacing. FIG. 7 illustrates an example of breaking a DP color-seeding violation formed by an odd number of links on a path between two shapes pre-assigned with the same color by moving one of the corresponding shapes away from a neighboring shape. Specifically, this figure illustrates in two different stages 725 and 730 that a color-seeding violation between the nodes 1 and 4 of the design layout 700 is getting resolved by moving shape 4 away from shape 3.

In the first stage 725, the shapes 1-4 are apart from one another at a distance smaller than the minimum same color spacing 710. The shapes 1 and 4 are pre-assigned to the same color and thus having a color-seeding violation because there are an odd number of links on the path 730 between them. In the second stage 725, the color-seeding violation between the nodes 1 and 4 is resolved by moving the shape 4 to the right such that the shape 4 is apart from the shape 3 at a distance greater than the minimum same color spacing 710. To move edges, some embodiments move the shapes that have the moving edges. Some embodiments trim or enlarge shapes as the edge(s) of the shapes are moved. For instance, the horizontal rectangle of shape 4 is elongated to facilitate the movement of the upper vertical rectangle to the right.

Now the shapes 3 and 4 are apart from each other at a distance larger than the minimum same color spacing. As a result, there is no longer a link between the shapes 3 and 4 and there is no longer a path between shapes 1 and 4. Therefore, the shapes 1 and 4 no longer form a color-seeding violation.

Figure 8:
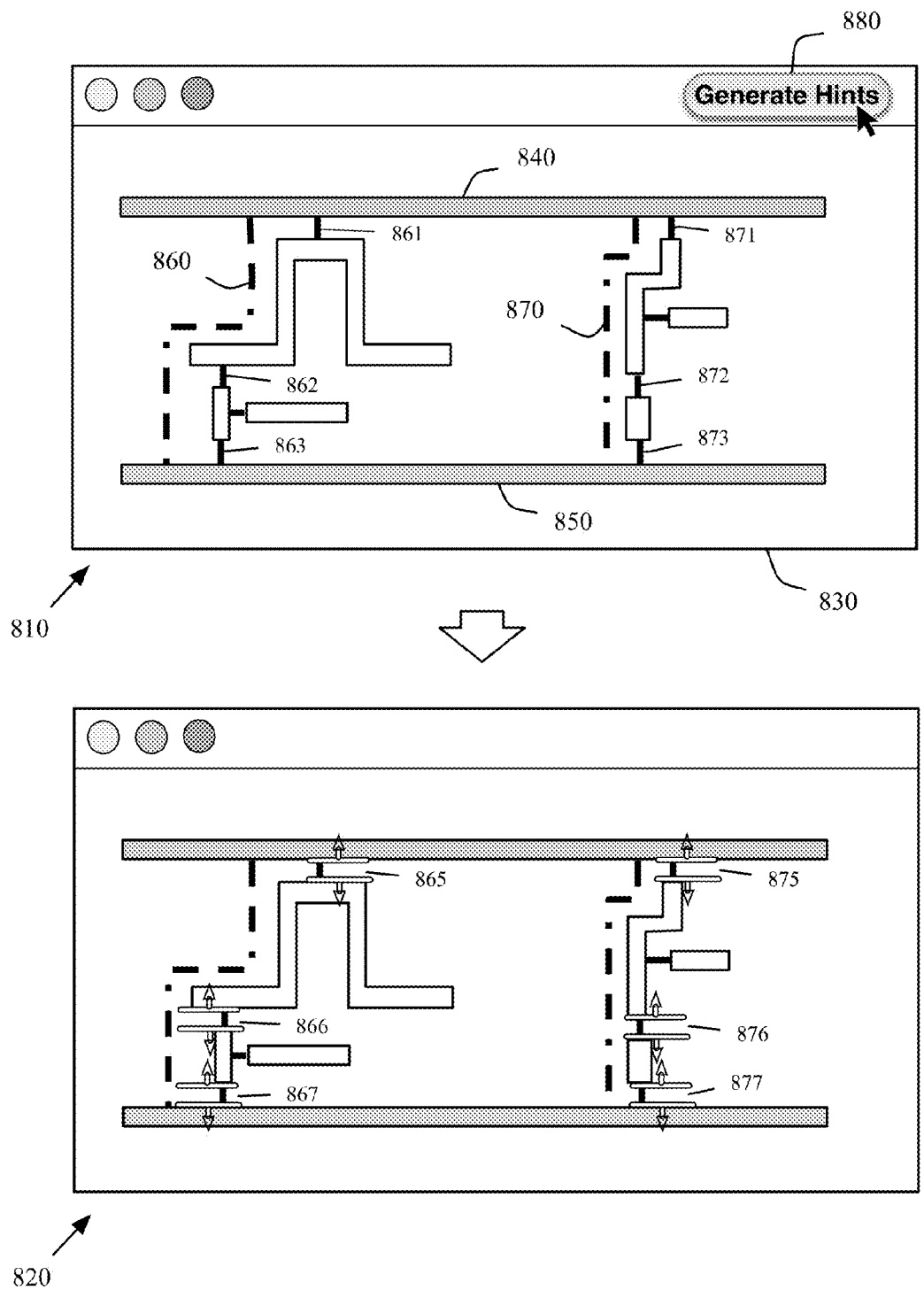
FIG. 8 illustrates an example of a graphical user interface (GUI) for generating and displaying layout fixing hints for DP color-seeding violations.

FIG. 8 illustrates an example of a graphical user interface (GUI) of an EDA application of some embodiments for generating and displaying the layout-fixing hints for resolving DP color-seeding violations. Specifically, this figure illustrates in two different stages 810 and 820 that a design layout with color-seeding violations is being analyzed to identify layout-fixing hints. The design layout is displayed in the GUI 830.

In the first stage 810, the design layout is displayed as a set of shapes and links. Two shapes 840 and 850 are pre-assigned with the same color, which means they are pre-assigned to the same mask. One of ordinary skill in the art will recognize that there are other ways to indicate mask assignment instead of the coloring of shapes. For example, shapes can be associated with a number or a symbol to indicate their mask assignment. Two error paths 860 and 870 have been identified between the color-seeding shapes 840 and 850. The first error path 860 includes three links 861-863. The second error path 870 includes three links 871-873. There is a generate-hints button 880 in the GUI 830. A user can select the generate-hints button 880 to generate layout-fixing hints for the design layout.

In the second stage 820, the GUI 830 displays several layout-fixing hints for each error path after the user selection of the generate-hints button 880. A layout-fixing hint represents a solution for eliminating a color-seeding violation by breaking one or more links between two shapes. In some embodiments, a layout-fixing hint includes a link marker or a set of link markers associated with a particular error path. Breaking the link or the set of links associated with the link markers will guarantee the elimination of the particular error path without introducing new error paths. Because a color-seeding violation on an error path between two pre-colored shapes could be fixed by breaking one of the several links on the error path, an EDA application may generate multiple layout-fixing hints for an error path. Anyone of the layout-fixing hints for an error path can be used to resolve the color-seeding violation on the error path. As illustrated in the figure, three layout-fixing hints 865-867 are generated and displayed for the error path 860 and three layout-fixing hints 875-877 are generated and displayed for the error path 870. Any of the three layout-fixing hints 865-867 can be used to resolve the color-seeding violation on the error path 860. Similarly, any of the three layout-fixing hints 875-877 can be used to resolve the color-seeding violation on the error path 870.

In some embodiments, each layout-fixing hint includes a set of moving instructions regarding how shapes or edges of the shapes need to be moved in order to resolve a color-seeding violation. Once the layout-fixing hints are displayed in the GUI 830, a user is able to resolve the color-seeding violations based on the moving instructions provided by the layout-fixing hints. It is to be noted that the layout-fixing hints do not have to be in the forms that are depicted as in this figure. Any geometric shapes or descriptive text will suffice.

In some embodiments, an EDA application for generating layout-fixing hints for resolving color-seeding violation has two components: a back-end engine and a front-end GUI. The back-end engine, as described below by reference to FIG. 9, identifies the color-seeding violations and generates the layout-fixing hints for resolving those color-seeding violations. The back-end engine writes the generated layout-fixing hints to a hint database. The front-end GUI retrieves the layout-fixing hints from the hint database and displays them to help the user to fix the color-seeding violations for double patterning.

Several more detailed embodiments of the layout-fixing guideline system are described in the sections below. Section I describes a method of some embodiments that generates layout-fixing hints for error paths. Next, Section II describes a method of some embodiments that evaluates the feasibility of layout-fixing hints. Section III describes a method of some embodiments that displays layout-fixing hints according to a priority score for each hint. Finally, Section IV describes an electronic system that implements some embodiments of the invention.

I. Hint Generation

Figure 9:
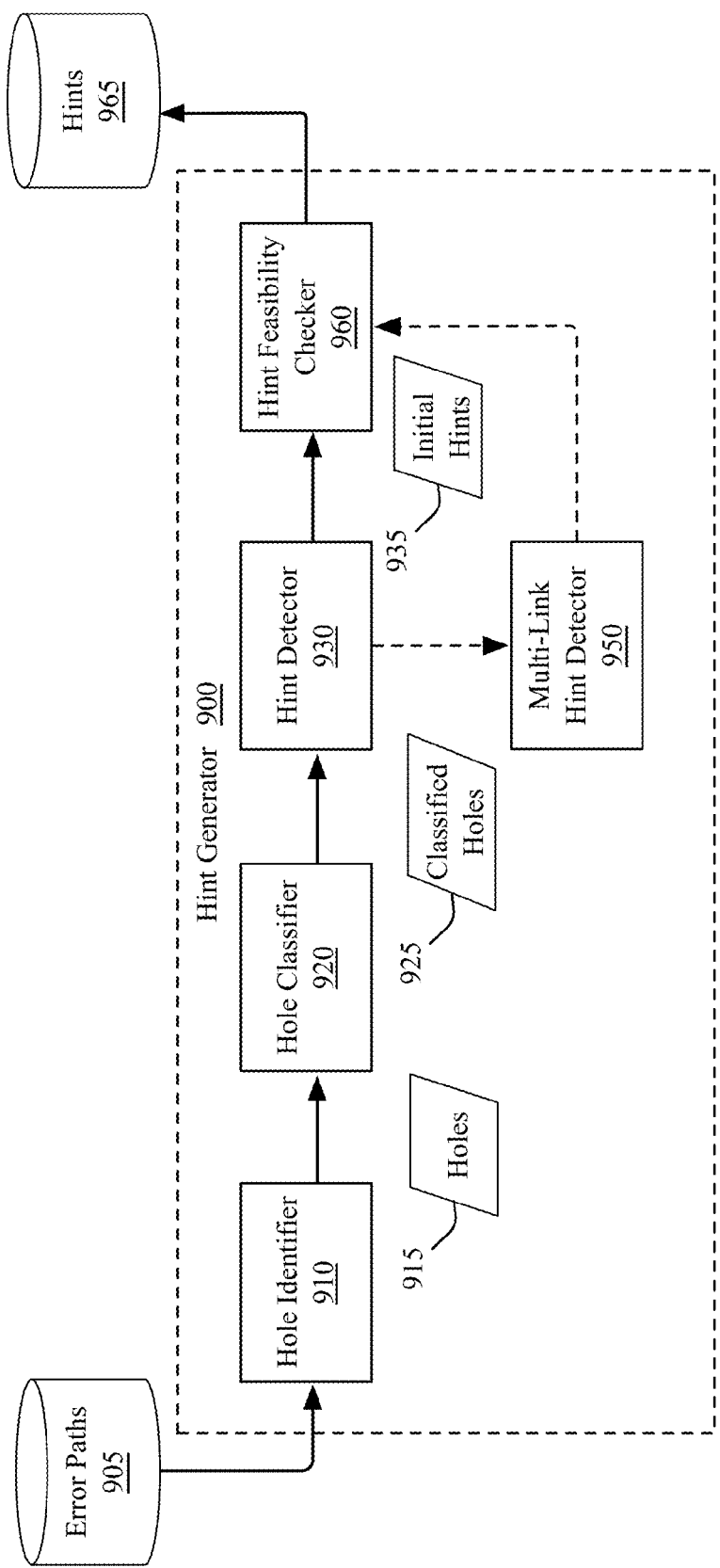
FIG. 9 conceptually illustrates a hint generator of some embodiments.

FIG. 9 conceptually illustrates a hint generator 900 of some embodiments. Specifically, the figure illustrates a set of components for generating layout-fixing hints that resolve DP color-seeding violations. The hint generator 900 retrieves a set of error paths identified by an EDA application and generates layout-fixing hints for the retrieved error paths. In some embodiments, the hint generator 900 is a stand-alone software application, while in other embodiments the hint generator 900 is part of an EDA application. This figure illustrates an error path repository 905, the hint generator 900, and a hint repository 965. The hint generator 900 includes a hole identifier 910, a hole classifier 920, a hint detector 930, and a hint feasibility checker 960. FIG. 9 is described below with reference to FIG. 10.

The error path repository 905 stores error paths identified by an EDA application. Each error path connects two color-seeding shapes (i.e., a source node and a destination node) that have a color-seeding violation. The source node and the destination node form an error node pair. The error path repository 905 of some embodiments receives the error paths from EDA applications, which identify error paths that contain color-seeding violations. In some embodiments, the error paths stored in the error path repository 905 are in a database file format.

To identify the error paths, the EDA application of some embodiments receives a layer of the design layout that includes several color-seeding shapes. The EDA application performs an analysis on the received layer of the design layout to identify several error paths. Each error path connects two color-seeding shapes that have a color-seeding violation. In order to perform the analysis to identify error paths, the EDA application of some embodiments identifies a set of disjoint sets. Any two shapes in a disjoint set are connected to each other through at least one path. For each disjoint set, the EDA application determines whether the disjoint set includes two or more color-seeding shapes. When the disjoint set is determined to have two or more color-seeding shapes, the EDA application identifies a set of error paths within the disjoint set. The identified set of error paths includes all paths between two color-seeding shapes that have a color-seeding violation.

From the error path repository 905, the hole identifier 910 receives or retrieves a set of error paths between an error node pair and identifies all holes 915 in a disjoint set of shapes containing the error node pair. A disjoint set of shapes is a set of shapes in which each shape is within a threshold distance from at least one other shape in the design layout. A hole is a space enclosed by a loop formed by shapes in the disjoint set and their associated links. The hole identifier 910 of some embodiments identifies all the holes in the disjoint set and put all the identified holes into a hole list.

The hole classifier 920 receives a set of holes 915 from the hole identifier 915 and classifies them into different categories. There are three categories of holes: error-path hole, trivial hole, and non-error-path hole. An error-path hole is a hole that interacts with both color-seeding shapes (i.e., the source and destination nodes) of an error path. A trivial hole is a hole that interacts with at most two shapes in the disjoint set and is not an error-path hole. All other holes that are neither error-path hole nor trivial hole are defined as non-error-path holes.

Figure 10:
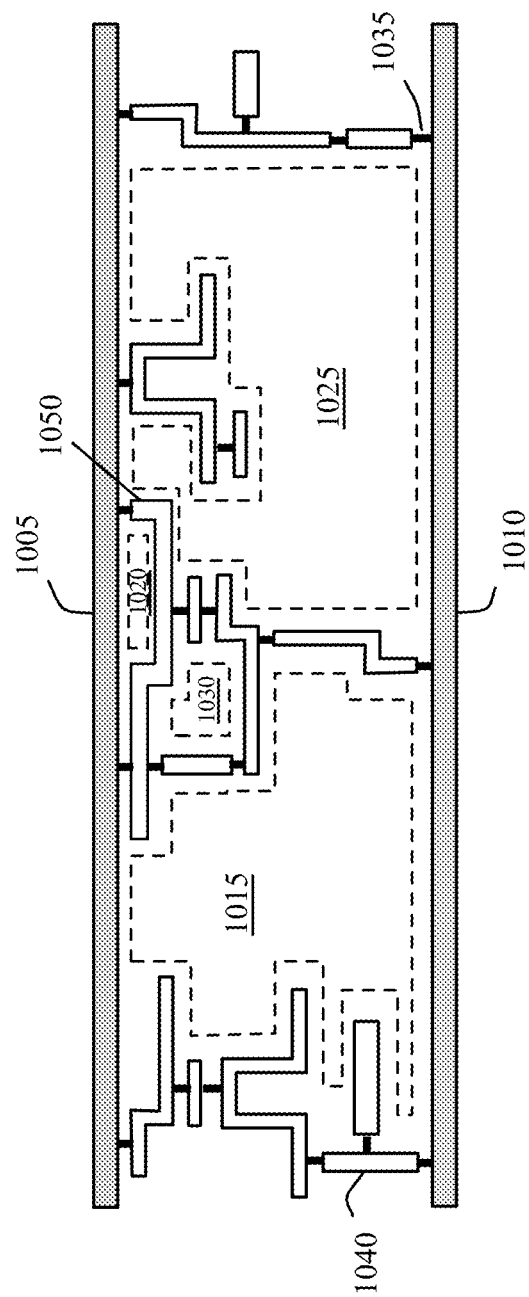
FIG. 10 conceptually illustrated different types of holes in a circuit design layout segment.

FIG. 10 conceptually illustrated different types of holes in a circuit design layout segment. Specifically, this figure illustrates the circuit design layout segment containing a union of all nodes and links that are connected to an error node pair. As shown, the figure illustrates a source node 1005, a destination node 1010, several uncolored nodes (e.g., node 1040) and several links (e.g., link 1035) between nodes. The source node 1005 and the destination node 1010 are pre-assigned with the same color and form an error node pair. The uncolored nodes and links illustrated in the figure is a union of all nodes and links that are connected to the error node pair of 1005 and 1010.

A hole is a space enclosed by a loop formed by nodes and links. As shown in FIG. 10, there are four holes 1015, 1020, 1025, and 1030 illustrated in dotted lines. Among them, holes 1015 and 1025 are error-path holes because they touch both the source node 1005 and the destination node 1010. Hole 1020 only touches the source node 1005 and the node 1050. Because the hold 1020 touches or interacts with at most two shapes and is not an error-path hole, it is a trivial hole. Hole 1030 does not touch either the source node 1005 or the destination node 1010. So it is not an error-path hole. Because the hole 1030 touches more than two shapes in the disjoint set, it is not a trivial hole. Therefore, the hole 1030 is a non-error-path hole.

Going back to FIG. 9, the hint detector 930 receives a set of classified holes 925 from the hole classifier 920 and generates a set of initial hints 935 based on the relationships between the classified holes 925 and the links on the error paths. The details of generating initial hints will be described below by reference to FIG. 11. In certain situations, a link is potentially a part of a "multi-link" hint. A "multi-link" hint is a hint composed of more than one link shapes between a pair of nodes. Breaking all the links of a multi-link hint will lead to the elimination of the particular error path that the multi-link hint belongs to. Therefore the multi-link hint detector 950 is used to determine whether there exists a multi-link hint between two neighboring shapes. The multi-link hint detector 950 generates an initial hint 935 when it detects a multi-link hint.

The hint feasibility checker 960 receives a set of initial hints 935 and evaluates the edges of the shapes on either side of the hint (i.e., the edges of the shapes connected by a link, which the hint suggest breaking) to determine the feasibility of the hint. A hint is feasible when its movability allows edges forming the hint to be moved in order to resolve the color-seeding violation. The movability measures a distance by which an edge of a hint can be moved within the constraints of the design or the design rules. Once the hint feasibility checker 960 determines a hint is feasible, the hint will be stored into the hint repository 965.

Figure 11:
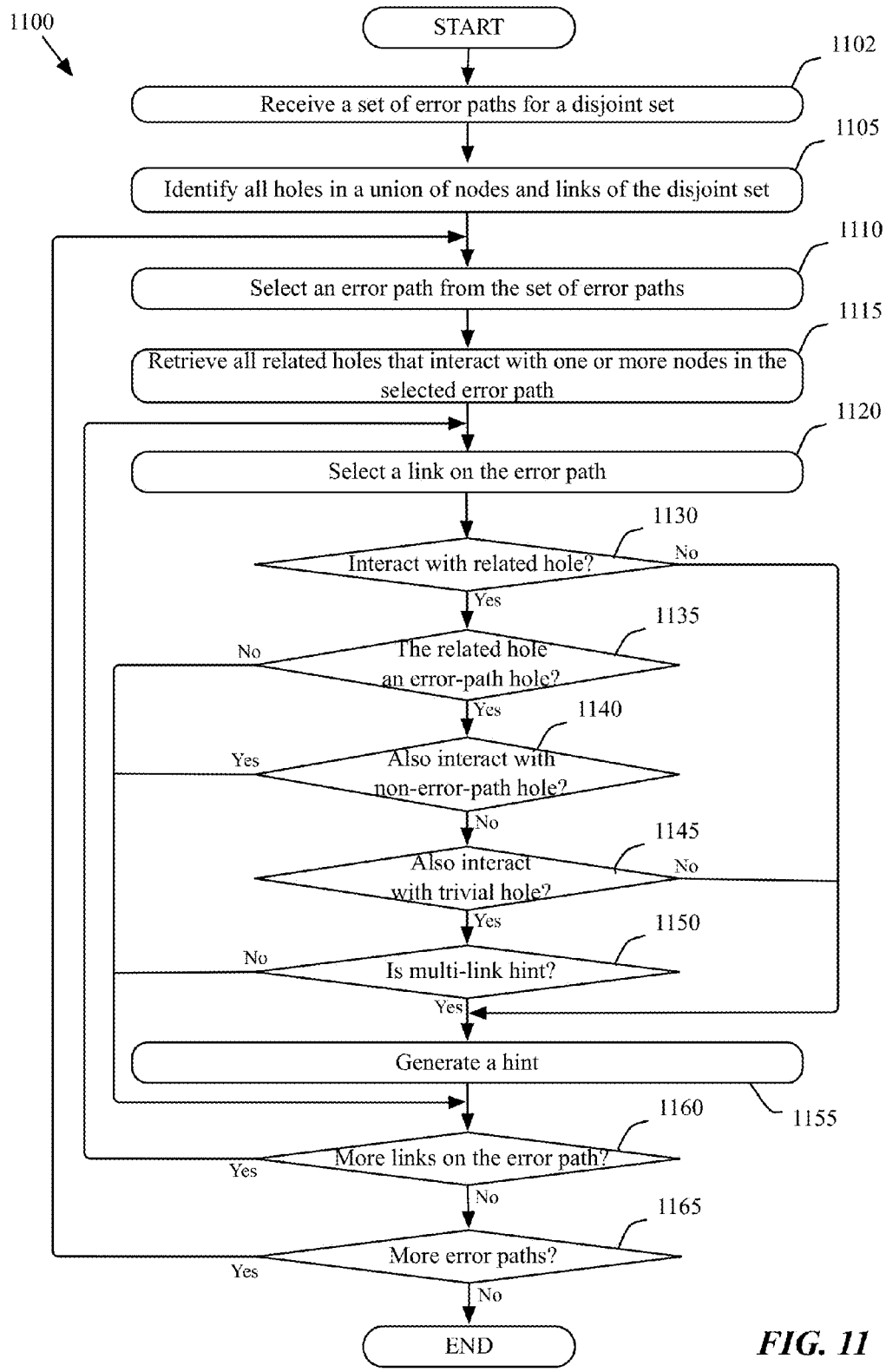
FIG. 11 conceptually illustrates a process performed by some embodiments to generate layout-fixing hints for aiding users to resolve color-seeding violations.

An example operation of the hint generator 900 will now be described by reference to FIG. 11. FIG. 11 conceptually illustrates a process 1100 performed by some embodiments to generate layout-fixing hints for aiding users to resolve the color-seeding violations. In some embodiments, the process 1100 starts after an EDA application has identified a set of error paths on a circuit design layout. As shown in FIG. 11, the process 1100 begins by receiving (at 1102) a set of error paths for a disjoint set of shapes. The process 1100 then identifies (at 1105) all holes in a union of nodes and links of the disjoint set.

Next, the process 1100 selects (at 1110) an error path from the set of error paths received at 1105. The process 1100 then retrieves (at 1115) all related holes that interact with one or more nodes in the selected error path. Next, the process 1100 selects (at 1120) a link on the error path. The process 1100 then determines (at 1130) whether the selected link interacts with any related hole.

When the process 1100 determines (at 1130) that the link does not touch any related hole, the process generates (at 1155) a layout-fixing hint that breaks the link. When the process 1100 determines (at 1130) that the link touches a related hole, the process determines (at 1135) whether the related hole is an error-path hole.

When the process 1100 determines (at 1135) that the related hole is not an error-path hole, the process proceeds to 1160. When the process 1100 determines (at 1135) that the related hole is an error-path hole, the process determines (at 1140) whether the selected link also interacts with a non-error-path hole.

When the process 1100 determines (at 1140) that the link touches a non-error-path hole, the process proceeds to 1160. When the process 1100 determines (at 1140) that the link does not touch any non-error-path hole, the process determines (at 1145) whether the selected link also interacts with a trivial hole.

When the process 1100 determines (at 1145) that the link does not touch any trivial hole, the process generates (at 1155) a layout-fixing hint that breaks the link. When the process 1100 determines (at 1145) that the link also touches a trivial hole, the process determines (at 1150) whether there exists a multi-link hint between the two end nodes of the link. When the process 1100 determines (at 5150) that there is a multi-link hint between the nodes, the process generates (at 5155) a multi-link hint. When the process 1100 determines (at 5150) that there is no multi-link hint between the nodes, the process proceeds to 1160. The details of determining whether there is multi-link hint will be described further below by reference to FIG. 12.

At 1160, the process 1100 determines whether there are more links on the error path need to be processed. When the process 1100 determines (at 1160) that there are more links on the error path, the process loops back to 1120 to select another link on the error path. When the process 1100 determines (at 1160) that there is no more link on the error path, the process determines (at 1165) whether there are more error paths need to be processed. When the process 1100 determines (at 1165) that there are more error paths, the process loops back to 1110 to select another error path from the set of received error paths. When the process 1100 determines (at 1165) that there is no more error path needs to be processed, the process terminates.

One of ordinary skill in the art will recognize that the process 1100 is a conceptual representation of the operations used to generate layout-fixing hints for assisting users to resolve the color-seeding violations in a design layout. The specific operations of the process 1100 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1100 is performed by one or more software applications that execute on one or more computers.

Figure 12:
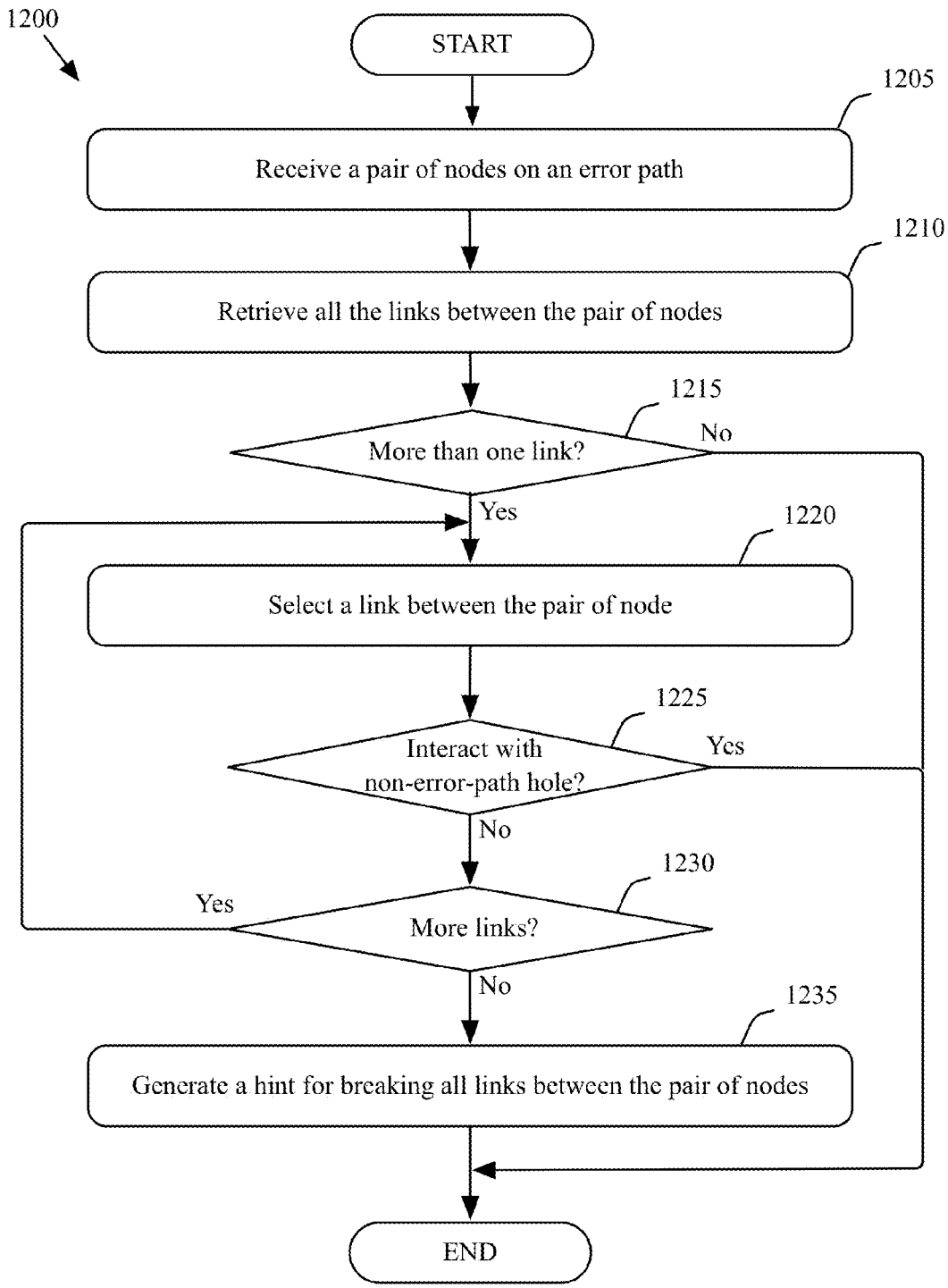
FIG. 12 conceptually illustrates a process performed by some embodiments to identify multi-link hints.

An example operation of the multi-link hint detector 950 will now be described by reference to FIG. 12. FIG. 12 conceptually illustrates a process 1200 performed by some embodiments to identify multi-link hints. In some embodiments, the process 1200 is launched when the process 1100 described above by reference to FIG. 11 determines (at 1145) that a selected link interacts with a trivial hole. The process 1200 begins by receiving (at 1205) a pair of nodes on an error path. The pair of nodes is connected by a link that is part of the error path. In some embodiments, the link connecting the pair of nodes interacts with a trivial hole.

The process 1200 then retrieves (at 1210) all the links between the pair of nodes. Next, the process 1200 determines (at 1215) whether there is more than one link between the pair of nodes. When the process 1200 determines (at 1215) that there is only one link between the pair of nodes, the process terminates. When the process 1200 determines (at 1215) that there is more than one link between the pair of nodes, the process selects (at 1220) a link between the pair of nodes.

Next, the process 1200 determines (at 1225) whether the selected link interacts with any non-error-path hole. When the process 1200 determines (at 5225) that the selected link touches a non-error-path hole, the process terminates. When the process 1200 determines (at 5225) that the selected link does not touch a non-error-path hole, the process determines (at 1230) whether there are more links between the pair of nodes. When the process 1200 determines (at 1230) that there are more links between the pair of nodes, the process loops back to 1220 to select another link between the pair of nodes. When the process 1200 determines (at 1230) that there is no more links between the pair of nodes (which means that none of the links between the pair of nodes interacts with a non-error-path hole), the process generates (at 1235) a multi-link hint for breaking all links between the pair of nodes.

One of ordinary skill in the art will recognize that the process 1200 is a conceptual representation of the operations used to identify multi-link hints. The specific operations of the process 1200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1200 is performed by one or more software applications that execute on one or more computers.

Figure 13:
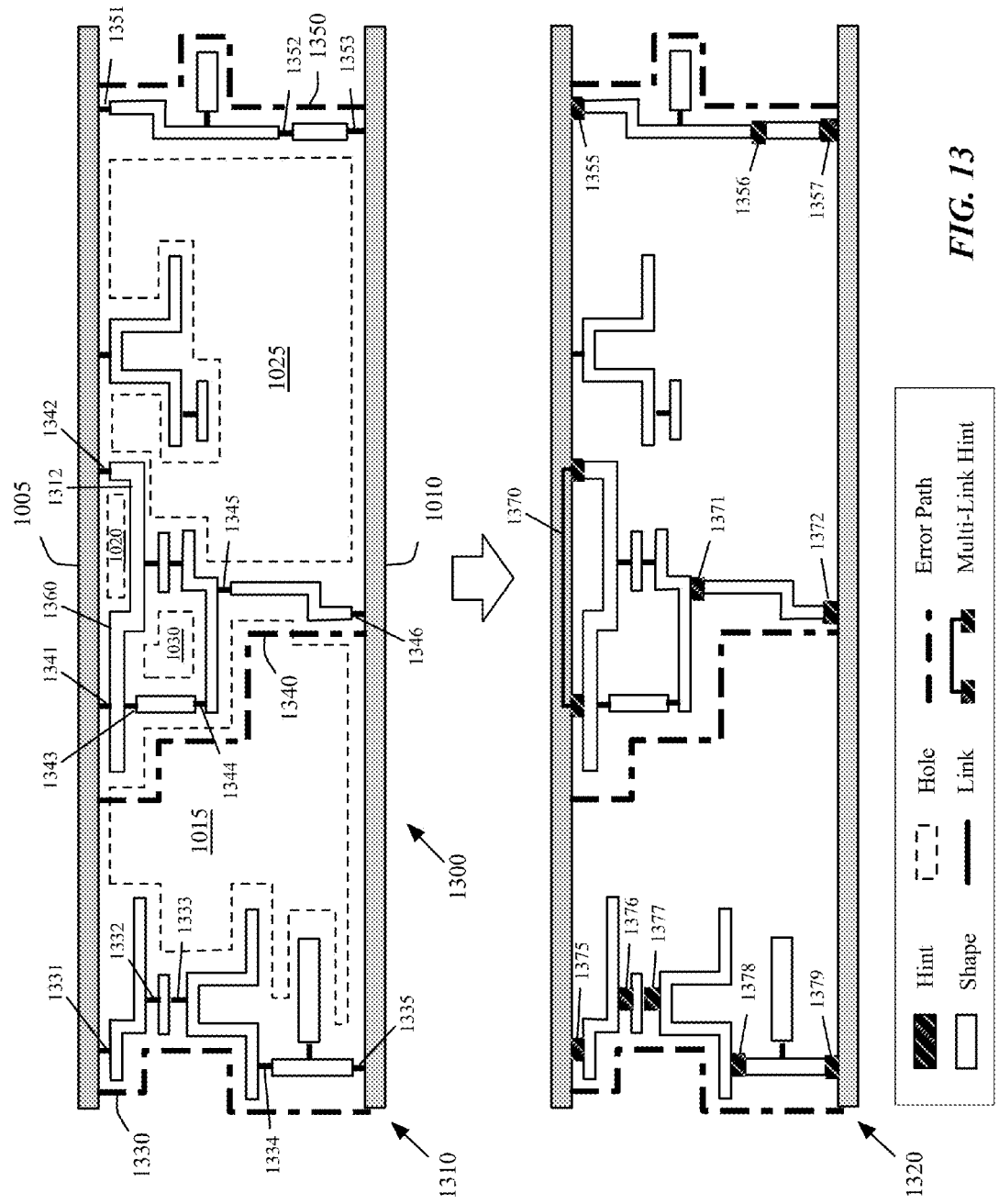
FIG. 13 illustrates an example of generating layout-fixing hints for a disjoint set.

FIG. 13 illustrates an example of generating layout-fixing hints for a disjoint set. Specifically, this figure illustrates in two operational stages 1310 and 1320 how to generate hints for resolving color-seeding violations between an error node pair 1005 and 1010. As shown in FIG. 13, the disjoint set 1300 includes a source node 1005, a destination node 1010, several uncolored nodes and several links that connect nodes. The source node 1005 and the destination node 1010 are pre-assigned with the same color and form an error node pair. The uncolored nodes and links illustrated in the figure is a union of all nodes and links that are connected to the error node pair of 1005 and 1010.

As shown in the first stage 1310, an EDA application of some embodiments performs an analysis on the disjoint set 1300 and identifies three error paths 1330, 1340, and 1350. The hole identifier 910 of some embodiments identifies four holes 1015, 1020, 1025, and 1030 illustrated in dotted lines. Subsequently, the hole classifier 920 of some embodiments classifies holes 1015 and 1025 as error-path holes because they interact with both shape 1005 and shape 1010. The hole classifier 920 of some embodiments classifies hole 1020 as a trivial hole because it interacts with only shapes 1005 and 1312 (i.e., interacts with at most two shapes). The hole classifier 920 of some embodiments classifies hole 1030 as a non-error-path hole because it is neither an error-path hole nor a trivial hole.

The hint detector 930 first selects link 1351 of the error path 1350. Because the link 1351 touches the error-path hole 1025 and does not interact with any non-error-path hole or trivial hole, a hint 1355 is generated for breaking the link 1351, as illustrated in the second stage 1320. The hint detector 930 then selects the link 1352 of the error path 1350 for processing. Because the link 1352 touches the error-path hole 1025 and does not interact with any non-error-path hole or trivial hole, a hint 1356 is generated for breaking the link 1352, as illustrated in the second stage 1320. Next, the hint detector 930 selects the link 1353 of the error path 1350. Because the link 1353 touches the error-path hole 1025 and does not interact with any non-error-path hole or trivial hole, a hint 1357 is generated for breaking the link 1353, as illustrated in the second stage 1320.

After finishing processing the links on the error path 1350, the hint detector 930 starts to process links on the error path 1340. The hint detector 930 first selects link 1341 of the error path 1340. The link 1341 touches the error-path hole 1015 and does not interact with any non-error path hole. Because the link 1341 also touches the trivial hole 1020, the link 1341 is potentially a part of a multi-link hint. The multi-link hint detector 950 is used to determine whether there is a multi-link hint between the source node 1005 and node 1360. The multi-link hint detector 950 retrieves all the links, i.e., links 1341 and 1342, between the nodes 1005 and 1360. Because neither of the links 1341 and 1342 interacts with a non-error-path hole, a multi-link hint 1370 is generated for breaking the links 1341 and 1342, as illustrated in the second stage 1320.

Next, the hint detector 930 selects link 1343 of the error path 1340 for processing. The link 1343 touches the error-path hole 1015. However, the link 1343 also touches the non-error-path hole 1030. Therefore, no hint is generated for the link 1343. For the exact same reason, no hint is generated for link 1344. The hint detector 930 then selects link 1345 of the error path 1340. Because the link 1345 touches the error-path holes 1015 and 1025, and does not interact with any non-error-path hole or trivial hole, a hint 1371 is generated for breaking the link 1345, as illustrated in the second stage 1320. Similarly, a hint 1372 is generated for breaking the link 1346 of the error path 1340.

After finishing processing the links on the error path 1340, the hint detector 930 starts to process links on the error path 1330. The hint detector 930 first selects link 1331 of the error path 1330. Because the link 1331 touches the error-path hole 1015 and does not interact with any non-error-path hole or trivial hole, a hint 1375 is generated for breaking the link 1331, as illustrated in the second stage 1320. For the same reason, hints 1376-1379 are generated for breaking the links 1332-1335 of the error path 1330, as illustrated in the second stage 1320.

II. Hint Feasibility Check

Once a layout-fixing hint for breaking a link on an error path has been identified, the flexibility of the spacing gap represented by the link may be used to determine the usability of the hint. The flexibility of spacing gap represented by the link, in some embodiments, is determined based on the movability of the edges of the shapes forming the gap. In this patent application, a gap is a feasible gap if the aggregate movability of the edges of the gap plus the current gap width is greater than the minimum same color spacing (the minimum spacing between two shapes on a single mask). As long as the edges of a hint gap can be moved to exceed the minimum same color spacing, the hint is determined to be a feasible hint.

Figure 14:
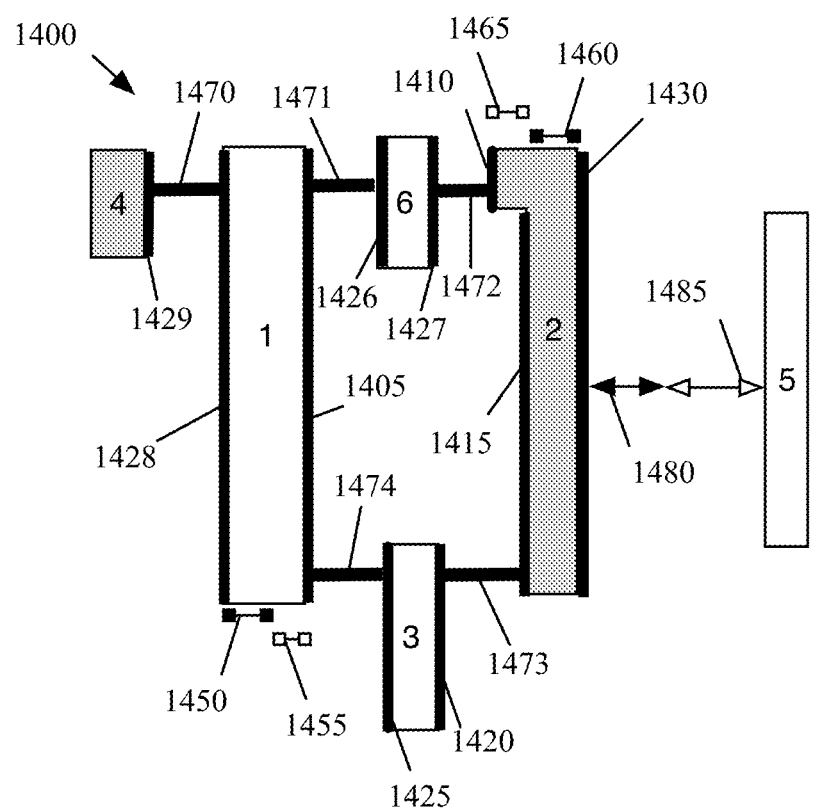
FIG. 14 illustrates a set of shapes and links for determining the movability of an edge.

FIG. 14 illustrates a set of shapes and links for determining the movability of an edge. FIG. 14 illustrates shapes 1-6, gaps 1470-1474, edges 1405-1430, shape widths 1450-1465, and gap widths 1480-1485. The shapes 2 and 4 are pre-colored with the same color. There are color-seeding violations between the shapes 2 and 4. Therefore, the error paths between the shapes 2 and 4 need to be broken in order to resolve the color-seeding violations. In some embodiments, the hint feasibility checker 960 of FIG. 9 may perform operations to determine the movability of an edge.

Edges 1405-1429 illustrate different edges of shapes along the error paths which may be evaluated for movability. Edge 1405 covers the entire right edge of shape 1. Edge 1410 covers the portion of shape 2 which borders gap 1472, and is a separate edge from edge 1415, although they are both on the left side of shape 2. These edges may be moved independently of each other and their movability will be calculated separately as well.

An opposing edge from a particular edge is the nearest edge on the opposite side of the shape from the particular edge. In this example, the opposing edge for both edges 1410 and 1415 is edge 1430. However, the opposing edge for edge 1430 would be edge 1415. Although both edges 1410 and 1415 are opposite edge 1430 at different sections, 1415 is the nearest edge.

Figure 15:
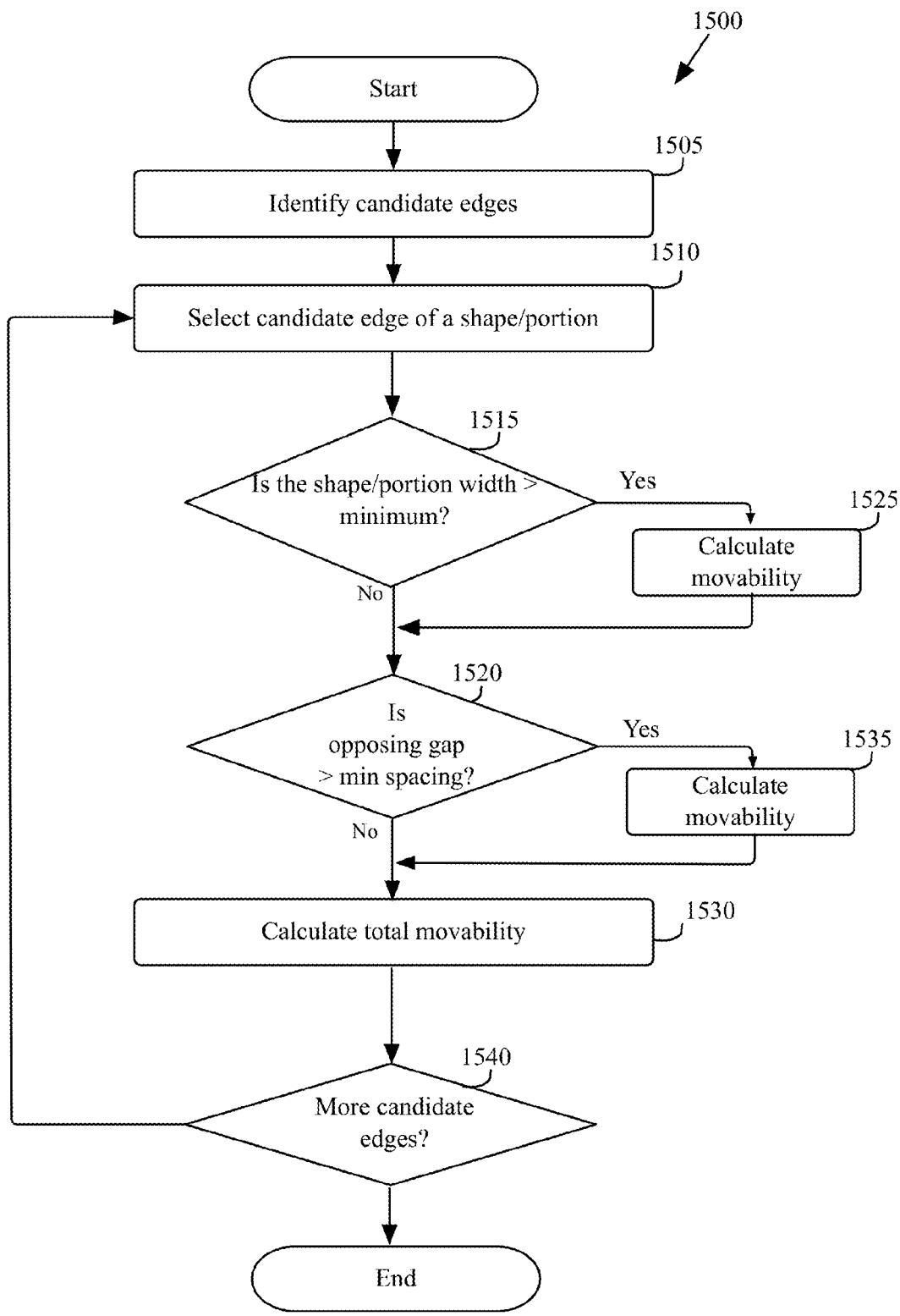
FIG. 15 conceptually illustrates a process of some embodiments for determining the total movability of each edge of a spacing gap.

FIG. 15, with reference to FIG. 14, conceptually illustrates a process 1500 of some embodiments for determining the total movability of each edge of a spacing gap. The process 1500 identifies (at 1505) the candidate edges. Candidate edges are the edges that make up the spacing gaps that make up links on the error path. Edges 1405-1429 are candidate edges in this example.

As illustrated by edge 1420, a candidate edge may extend beyond the area that directly faces a spacing gap. As shown, the edge may include an entire edge when any portion of that edge faces a spacing gap. In some embodiments, a candidate edge may be more limited and only include the portion of the edge that directly faces the spacing gap or include a specified area around the portion of the edge that directly faces the spacing gap.

The process 1500 then selects (at 1510) one of the candidate edges of a shape or a portion of a shape (e.g., edge 1415). The candidate edge may be selected at random or in an order based on the location of the edge within the layer of the layout design. The process 1500 determines (at 1515) whether the width of the shape/portion is greater than the minimum shape width. The width of a shape/portion is the distance between the edge and the opposing edge. As noted above, when an edge has multiple opposing edges, the opposing edge will be the nearest opposing edge. In this example, the width of the shape/portion measured from edge 1410 will be the distance from edge 1410 to edge 1430. However, the width of the shape/portion measured from edge 1430 will be the distance from edge 1430 to edge 1415.

When the process 1500 determines (at 1515) that the width is not greater than the minimum shape width, then the process 1500 continues to 1520, described below. Otherwise, the process calculates (at 1525) the movability of the edge based on the width of the shape or portion where the edge can be moved by making the shape narrower. This may be referred to as the width movability. The movability will be the amount by which the shape or portion width is greater than the minimum shape width. In this example, minimum shape width is illustrated by a line with black boxes on either end. Shape 1 is wider than the minimum shape width 1450 by an excess distance 1455. The movability calculated for the edge 1405 would be the distance 1455. Another example is edge 1410. For the edge 1410, the minimum shape width 1460 leaves the width 1465 as the movable distance for edge 1410. The width movability of an edge is the difference between the width of the shape and the minimum shape width.

The process 1500 determines (at 1520) whether the gap facing the opposing edge of the shape/portion is wider than the minimum spacing for the design layout. When the gap facing the opposing edge of the shape/portion is not wider than the minimum spacing for the design layout, then the process 1500 continues to 1530 described below. When the gap facing the opposing edge is greater than the minimum spacing, the process 1500 calculates (at 1535) the movability of the edge due to the movability of the shape, or the shape movability. In this case, the shape, and therefore the edge, can be moved away from the gap. In this example, edge 1415 is moveable because the gap facing the opposing edge 1430 is greater than the minimum spacing 1480. The movability of an edge would be the difference between the width of the current gap of the opposing edge and the minimum spacing of the design layout. The shape movability of edge 1415 is equal to the width 1485. The process 1500 then continues to 1530.

An example of an edge which would not be movable is illustrated by edge 1430. Edge 1430 would not be movable away from its gap because its opposing edges 1415 and 1410 are facing gaps 1473 and 1472 respectively, which are both minimum spacings. In some embodiments, even if only one of the gaps were a minimum spacing, the edge 1430 would not be movable. This may be the case because in some cases it may be desirable to ensure that single edges are not split into multiple edges by moving only a portion of an edge. Thus, if any portion of an opposing edge is facing a gap with minimum spacing, the edge is not movable. However, in some embodiments, the movability may be calculated separately even for different portions of a single edge, allowing for a portion of an edge to be considered movable.

At 1530, the process 1500 calculates the total movability for the selected candidate edge. The total movability is the sum of the width movability calculated at 1525 and the shape movability calculated at 1535. The process 1540 determines (at 1540) whether there are more candidate edges that need to have the movability calculated. When there are remaining candidate edges, the process 1500 returns to step 1510. Otherwise the process 1500 ends.

Figure 16:
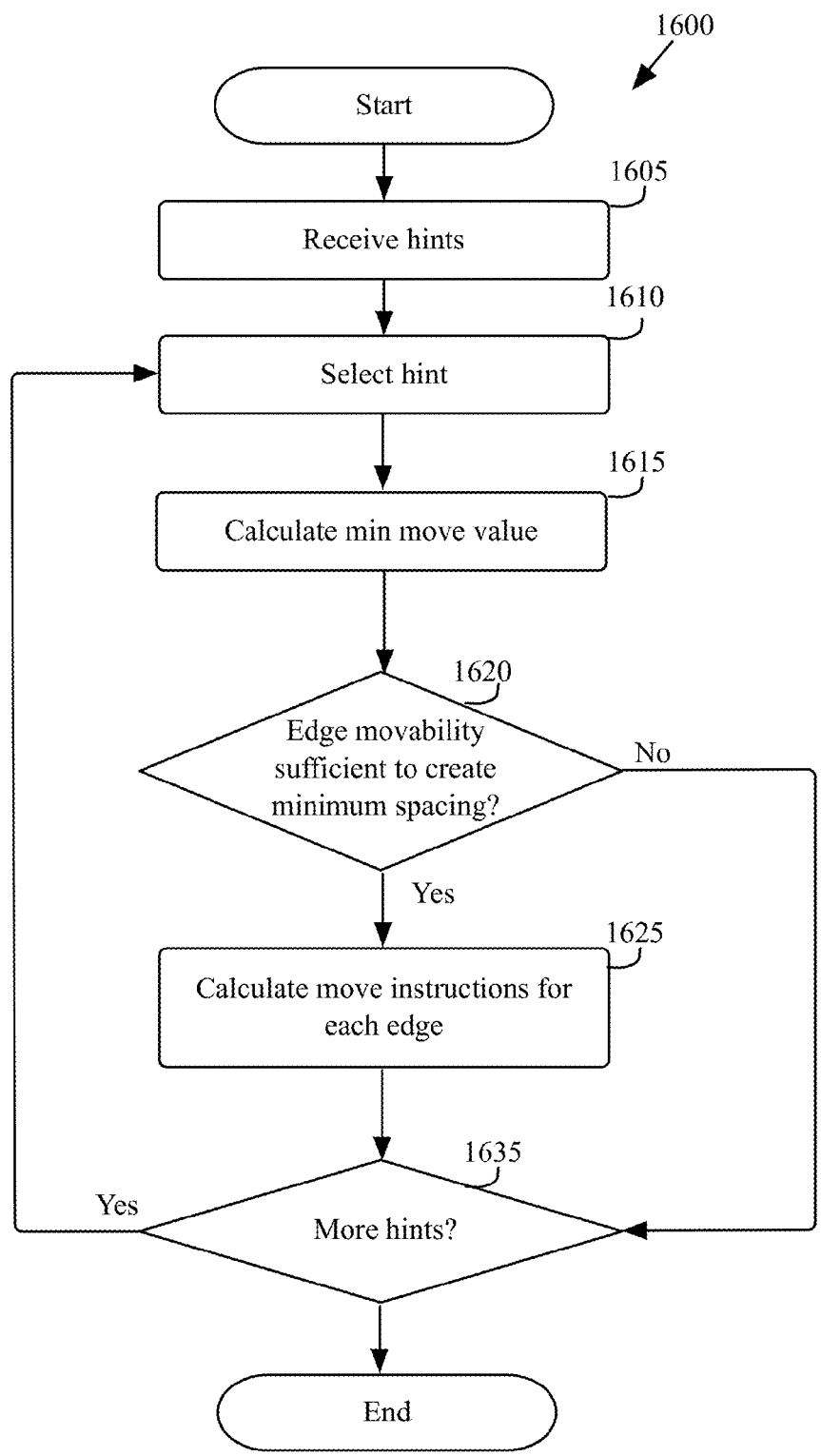
FIG. 16 conceptually illustrates a process of some embodiments for calculating move instructions for the hints.

FIG. 16 conceptually illustrates a process 1600 of some embodiments for calculating move instructions for the hints. Move instructions detail the recommended method on a particular spacing gap for resolving color-seeding violation. The move instructions may include the distance an edge should be moved as well as a direction. The process 1600 begins after the movability of the edges of each hint has been calculated by process 1500 of FIG. 15.

The process 1600 receives (at 1605) the hints for a particular error path that were calculated by process 1500. The process 1600 selects (at 1610) a first hint and calculates (at 1615) the minimum move value for the hint. The minimum move value for a hint is the minimum amount by which the edges of the hint need to be moved in order for the gap to be equal to the minimum same color spacing. The minimum move value may be calculated by an equation similar to:

Minimum move value=minimum same color spacing−current gap width

The process 1600 then determines (at 1620) whether the movability of the edges that make up the hint spacing gap is sufficient to create the minimum spacing necessary to break the link over the spacing gap. When the process 1600 determines (at 1620) that the movability of the edges that make up the hint spacing gap is not sufficient to create the minimum spacing necessary to break the link, the process does not generate move instructions for the particular hint spacing gap and proceeds to 1635 described below. When the movability is sufficient to create the minimum spacing necessary to resolve a hint spacing gap, then the process 1600 calculates (at 1625) the move instructions for each edge associated with the hint. In some embodiments, the move instructions for each edge and its facing edge (the edge on the other side of the gap) will be as close to half of the minimum move value as possible. When both movabilities are greater than half of the minimum move value, then both edges will have a move instruction for half of the minimum value. Otherwise, the edge with less than half of the minimum move value will have a move instruction for all of its movability, while the move instruction for the other edge will make up for the difference. For example, if the minimum move value is 0.01 μm, but edge 1 can only move by 0.003 μm and the facing edge 2 can move by 0.01 μm, edge 1 will have a move instruction for 0.003 μm and edge 2 will have a move instruction for the remaining 0.007 μm.

In other embodiments, distribution of the move instructions may be calculated differently. In some embodiments, the distribution may be calculated to evenly distribute the remaining movability of the edges. Using the same example where edge 1 can move 0.003 μm and edge 2 can move by 0.01 μm, edge 1 and edge 2 have a total of 0.013 μm movability, but only require 0.01 μm, leaving an extra 0.003 μm. Dividing this excess space between the two edges would generate a move instruction of 0.0015 μm for edge 1 and a move instruction of 0.0085 μm for edge 2. This would leave 0.0015 μm of movability for both edges after the move instructions have been executed.

In other embodiments, the move instructions may distribute the movability in a manner proportional to the movability of the edges. Using the same example, edge 1 would have a move instruction of ~77% (0.01 μm/0.013 μm) of the minimum move value and edge 2 would have a move instruction of ~23% (0.003 μm/0.013 μm) of the minimum move value. Since the minimum move value in this example is 0.01, edge 1 would have a move instruction ~0.0077 μm and edge 2 would have a move instruction ~0.0023 μm. In some embodiments, these move instructions are rounded to the nearest nm, and would result in move instructions of 8 nm and 2 nm respectively. In some embodiments these move instructions may be represented in a plain text format, indicating the vertices of a visual indication of the hint, as well as a direction and a distance to move the edge. In some embodiments, the instructions for a hint spacing gap's edges are stored in the following exemplary format:

(MOVE (EDGE 113 150 160 150) (DIRECTION NORTH 16))
(MOVE (EDGE 160 101 113 101) (DIRECTION SOUTH 16))

In this particular format, MOVE indicates that it is a move instruction. The EDGE portion indicates the coordinate location of the visual edge indicator. The coordinates may be the x and y coordinates of two ends of the edge. DIRECTION indicates the direction (NORTH and SOUTH) and distance (16 and 16 measured in nanometers) to move the particular edge. In some embodiments, the move instructions may use geographic directions (north, south, east and west) to indicate directions within the layer of the layout design, with north being at the top of the screen. Different embodiments may use other methods for distributing the movability of the hint spacing gap edges and for storing the generated move instructions.

The process 1600 then determines (at 1635) whether there are any remaining hints for processing. If there are remaining hints for processing, the process 1600 returns to 1610. Otherwise, the process 1600 ends.

Figure 17:
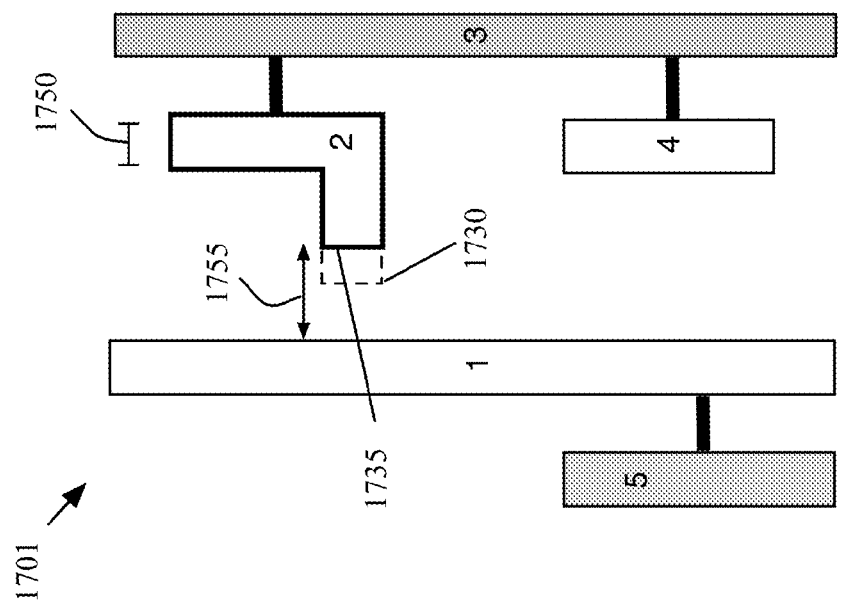
FIG. 17 illustrates an example of the resolution of a spacing gap in some embodiments.
Figure 17:
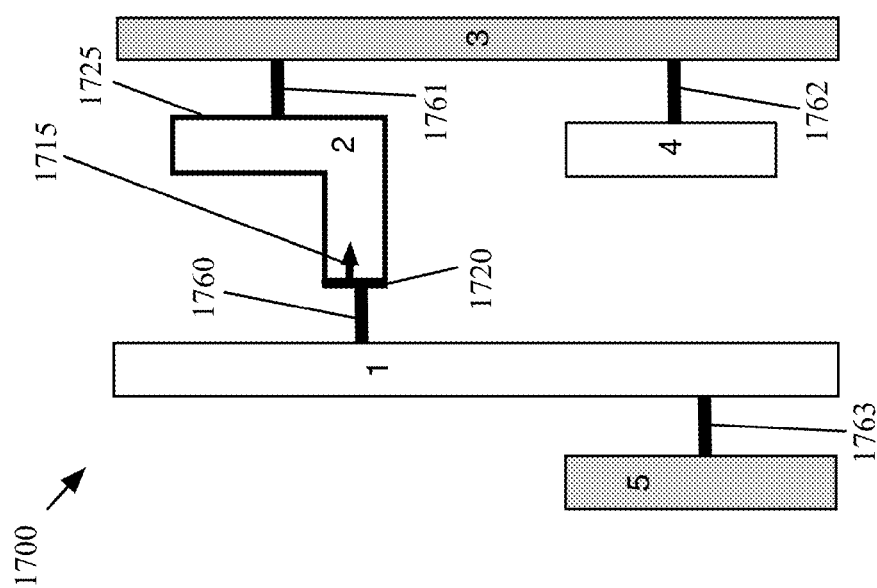

FIG. 17 illustrates an example of the resolution of a spacing gap in some embodiments. FIG. 17 illustrates shapes 1-5, gaps 1760-1763, a move instruction 1715, and a movable edge 1720 in two stages 1700 and 1701. Stage 1700 focuses on edge 1720 with move instruction 1715 and its effect on the color-seeding violation between two pre-colored nodes 3 and 5.

Edge 1720 of shape 2 is a moveable edge, not because the entire shape is moveable, but because the edge 1720 and the opposing edge 1725 are more than the minimum shape width 1750 apart. In this case, the edge 1720, can be moved away from gap 1760 in order to resolve the color-seeding violation, which means gap 1760 is a feasible spacing gap.

The second stage 1701 illustrates the shapes and gaps after the move instruction 1715 has been applied to edge 1720. The second stage 1701 shows that the horizontal leg of shape 2 has been shortened by moving the edge 1720 from its original location 1730 indicated by a dashed line to its new location 1735. The new location 1735 creates a new gap 1755 that is greater than the minimum same color spacing for the design layout, resolving the spacing gap between shapes 1 and 2 to break the error path between the pre-colored nodes 3 and 5. This resolves the color-seeding violation between the nodes 3 and 5.

A layout-fixing hint is a defined as a strong hint when moving one of the touching edges on the corresponding shape associated with the hint can easily break the link associated with the hint. That is, a strong hint is a hint that is feasible. A hint is considered a weak hint when the hint is not feasible, i.e., the link associated with the hint cannot easily be broken. Each layout-fixing hint is assigned a priority value. In some embodiments, higher priority value indicates stronger hint. Some embodiments of this invention assign the highest priority value to a strong hint associated with a single link. In some embodiments, the second highest priority value is assigned to a strong hint associated with multiple links, where each associated link is feasible (i.e., breakable). Some embodiments of this invention assign the third highest priority value to a weak link associated with a single link. In some embodiments, the lowest priority value is assigned to a weak hint associated with multiple links. Layout-fixing hints are sorted when they are presented to the user of an EDA application (e.g., a layout designer). In some embodiments, only strong hints are shown to the user of the EDA application.

III. Display of Layout-Fixing Hints

Figure 18:
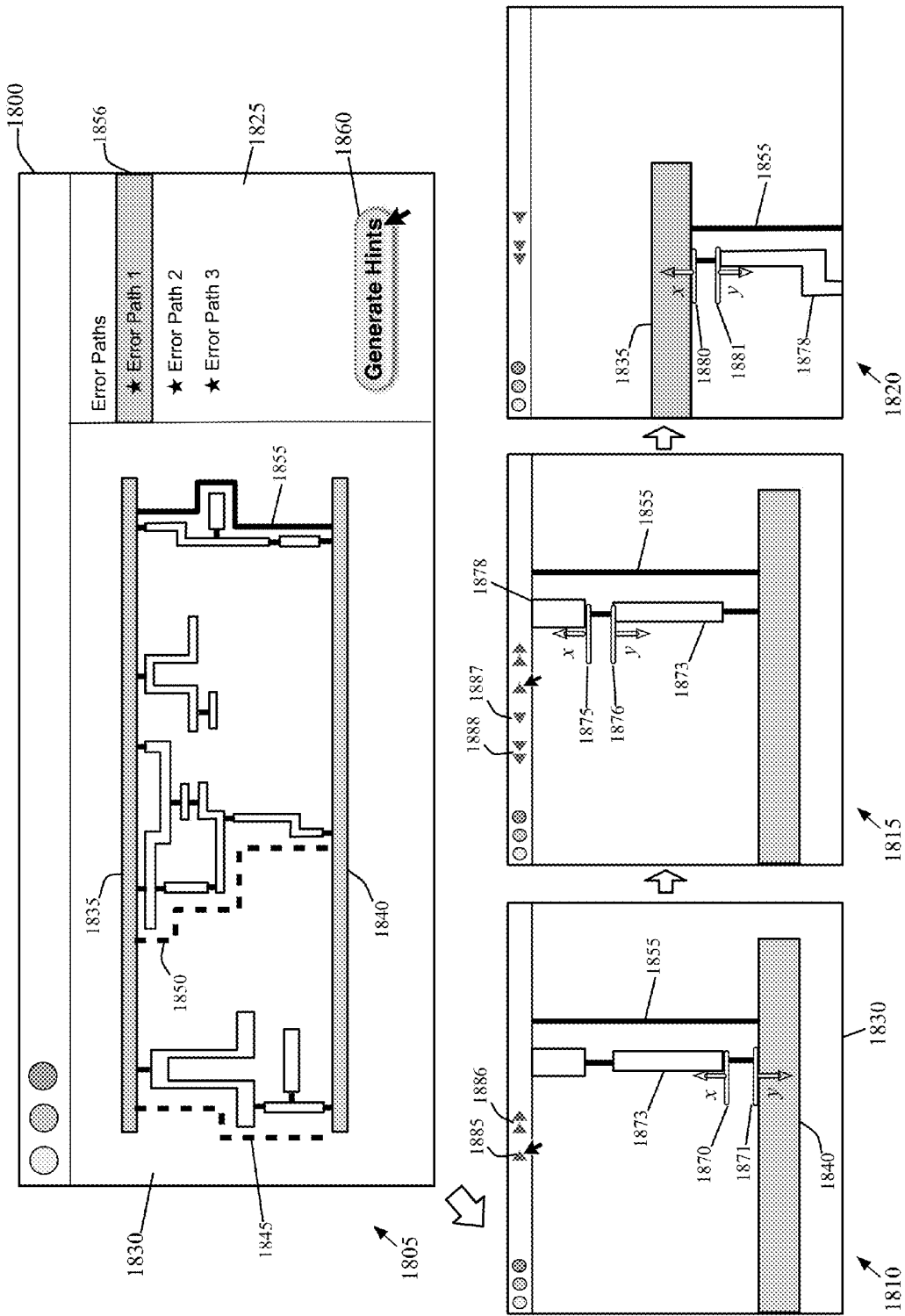
FIG. 18 illustrates a GUI of an EDA application that displays layout-fixing hints.

In order to aid the users in resolving the color-seeding violations, an EDA application of some embodiments generates the layout-fixing hints and displays them to the users. FIG. 18 illustrates a graphical user interface ("GUI") 1800 of an EDA application that displays layout-fixing hints. Specifically, this figure illustrates in four operational stages 1805-1820 how the GUI 1800 can be used to easily browse through generated layout-fixing hints for an error path. As shown in FIG. 18, the GUI 1800 includes an error path list pane 1825 and a hint display area 1830.

The error path list pane 1825 lists all the error paths that can be displayed in the GUI 1800. In this example, there are three list items, Error Path 1-3, listed in the error path list pane 1825. When the EDA application receives a selection of a list item listed in the error path list pane 1825, the EDA application highlights the corresponding error path shape in the hint display area 1830. The error path list pane 1825 also includes a generate-hints button 1860 that when selected will generate hints for the selected error path. One of ordinary skill in the art will recognize that the generate-hints button 1860 does not have to be located in the error path list pane 1825. In fact, the generate-hints button 1860 could be located anywhere in the GUI 1800 in any shape or form, as long as it is reasonably accessible to the user.

The hint display area 1830 displays a graph representation of a design layout. In this example, a disjoint set of nodes is displayed in the hint display area 1830. The disjoint set of nodes is a union of all nodes connected to a pair of pre-colored shapes 1835 and 1840. The shapes 1835 and 1840 are pre-assigned with the same color (illustrated in the figure as solid gray). This means the designer has pre-assigned the shapes 1835 and 1840 to the same mask. There are three error path shapes 1845, 1850, and 1855 displayed in the hint display area 1830. Each of the error path shapes 1845, 1850, and 1855 indicates a color-seeding violation between the nodes 1835 and 1840. The EDA application will highlight an error path shape when it receives a selection of the corresponding list item in the error path list pane 1825. As illustrated in the figure, the error path shape 1855 is highlighted because its corresponding list item 1856 is selected in the error path list pane 1825, as indicated by the darkened list item 1856.

Having described the elements of the GUI 1800, the operations of browsing generated layout-fixing hints will now be described by reference to the state of the GUI 1800 during the four stages 1805-1820 that are illustrated in FIG. 18. In the first stage 1805, the list item 1856 representing Error Path 1 is selected in the error path list pane 1825. As shown in the first stage 1805, the error path shape 1855 is highlighted in the hint display area 1830 because it corresponds to the selected list item 1856 in the error path list pane 1825. A highlighted error path shape helps the user visually identify the error path of interest in order to generate the layout-fixing hints. The user can highlight another error path shape in the hint display area 1830 by selecting a different list item in the error path list pane 1825. Now that the error path 1855 is selected, the user can select the generate-hints button 1860 to generate hints for the error path 1855. In some embodiments, the generated layout-fixing hints are sorted based on priority values assigned to them and will be displayed according to the result of the sorting. A hint with a higher priority value is displayed before a hint with a lower priority value.

In the second stage 1810, the hint display area 1830 displays two markers 1870 and 1871 as a first layout-fixing hint for the error path 1855 after the user has selected the generate-hints button 1860. In some embodiments, the marker 1870 indicates to the user of the EDA application that the shape 1873 needs to be moved up for a distance of x in order to fix the color-seeding violation. The marker 1871 indicates to the user that the shape 1840 needs to be moved down for a distance of y in order to fix the color-seeding violation. By moving the shape 1873 up for the distance of x and moving the shape 1840 down for the distance of y, the distance between the shapes 1873 and 1840 will be greater than the minimum same color spacing. As a result, the error path 1855 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the first hint represented by the markers 1870 and 1871, the user can select a selectable UI item (e.g., the button 1885) to browse the next hint or select a selectable UI item (e.g., the button 1886) to browse the last hint, i.e., the hint with the lowest priority value.

In the third stage 1815, the hint display area 1830 displays two markers 1875 and 1876 as a second layout-fixing hint for the error path 1855 after the user has selected a selectable UI item (e.g., the button 1886) at the second stage 1810. In some embodiments, the marker 1875 indicates to the user of the EDA application that the shape 1878 needs to be moved up for a distance of x in order to fix the color-seeding violation. The marker 1876 indicates to the user that the shape 1873 needs to be moved down for a distance of y in order to fix the color-seeding violation. By moving the shape 1878 up for the distance of x and moving the shape 1873 down for the distance of y, the distance between the shapes 1873 and 1878 will be greater than the minimum same color spacing. As a result, the error path 1855 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the second hint represented by the markers 1875 and 1876, the user can select a selectable UI item (e.g., the button 1885) to browse the next hint, select a selectable UI item (e.g., the button 1886) to browse the last hint, select a selectable UI item (e.g., the button 1887) to browse the previous hint, or select a selectable UI item (e.g., the button 1888) to browse the first hint, i.e. the hint with the highest priority value.

In the fourth stage 1820, the hint display area 1830 displays two markers 1880 and 1881 as a third layout-fixing hint for the error path 1855 after the user has selected a selectable UI item (e.g., the button 1886) at the third stage 1815. In some embodiments, the marker 1880 indicates to the user of the EDA application that the shape 1835 needs to be moved up for a distance of x in order to fix the color-seeding violation. The marker 1881 indicates to the user that the shape 1878 needs to be moved down for a distance of y in order to fix the color-seeding violation. By moving the shape 1835 up for the distance of x and moving the shape 1878 down for the distance of y, the distance between the shapes 1835 and 1878 will be greater than the minimum same color spacing. As a result, the error path 1855 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number.

One of ordinary skill in the art will recognize that the GUI 1800 is a conceptual representation of the operations used to generate and display layout-fixing hints. The specific operations and/or elements of the GUI need not in the exact form as shown and described. For example, the GUI 1800 may include more elements and controls to perform the operations. The GUI 1800 may use a tab control to display list all generated hints and to display each of them in separate tabs. In addition, the markers used to represent a hint need not in the exact form or shape as shown and described. For example, the markers could be in some other geometry forms or in descriptive text.

Figure 19:
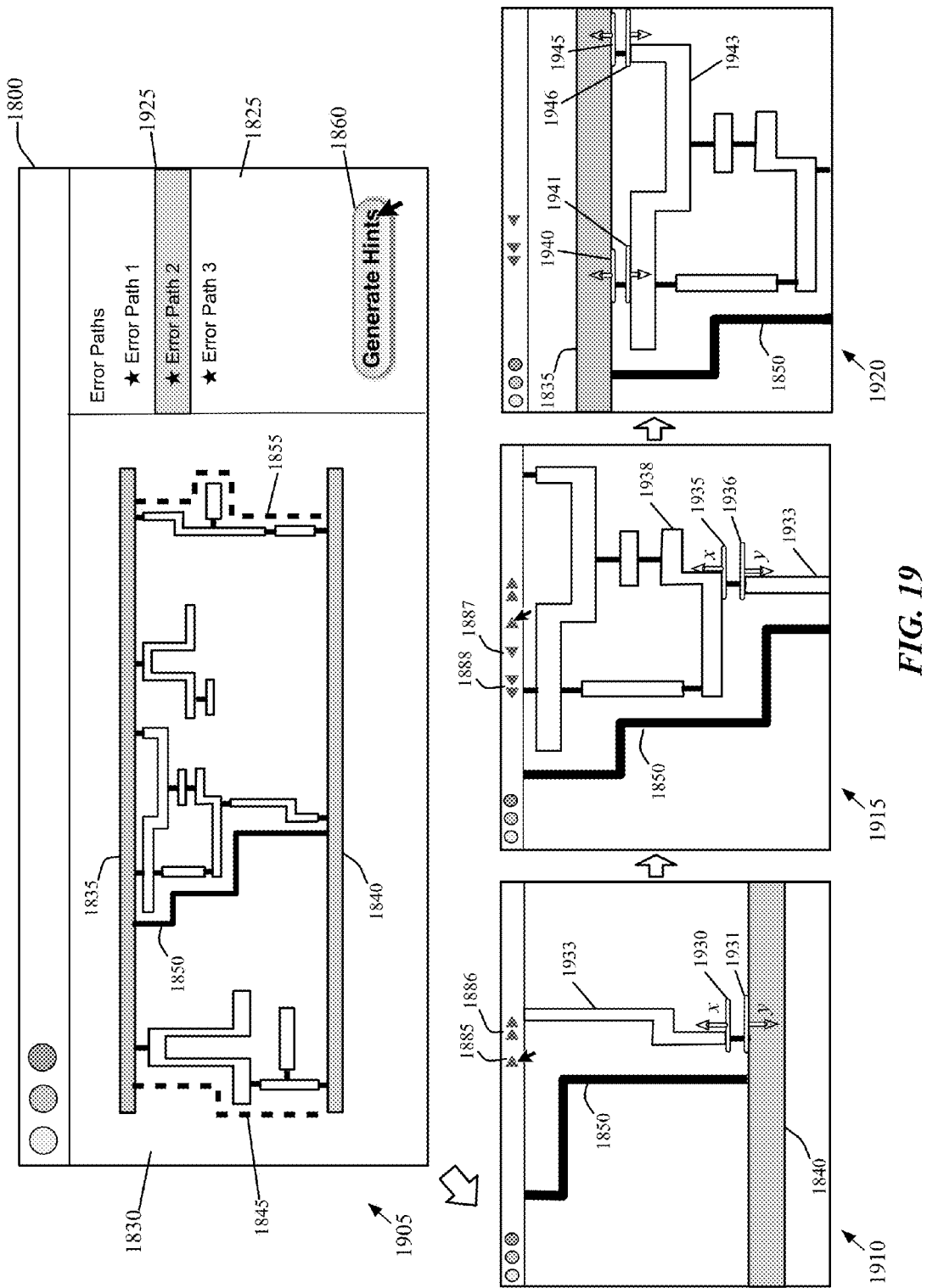
FIG. 19 illustrates the GUI of the EDA application that displays layout-fixing hints for a second error path.

FIG. 19 illustrates the GUI 1800 of the EDA application that displays layout-fixing hints for a second error path 1850. Specifically, this figure illustrates in four operational stages 1905-1920 how the GUI 1800 can be used to easily browse through generated layout-fixing hints for the second error path 1850. As illustrated in the figure, the error path shape 1850 is highlighted because its corresponding list item 1925 is selected in the error path list pane 1825, as indicated by the darkened list item 1925.

In the first stage 1905, the list item 1925 representing Error Path 2 is selected in the error path list pane 1825. As shown in the first stage 1905, the error path shape 1850 is highlighted in the hint display area 1830 because it corresponds to the selected list item 1925 in the error path list pane 1825. Now that the error path 1850 is selected, the user can select the generate-hints button 1860 to generate hints for the error path 1850. In some embodiments, the generated hints are sorted based on priority values assigned to them and will be displayed according to the result of the sorting. A hint with a higher priority value is displayed before a hint with a lower priority value.

In the second stage 1910, the hint display area 1830 displays two markers 1930 and 1931 as a first layout-fixing hint for the error path 1850 after the user has selected the generate-hints button 1860. In some embodiments, the marker 1930 indicates to the user of the EDA application that the shape 1933 needs to be moved up for a distance of x in order to fix the color-seeding violation. The marker 1931 indicates to the user that the shape 1840 needs to be moved down for a distance of y in order to fix the color-seeding violation. By moving the shape 1933 up for the distance of x and moving the shape 1840 down for the distance of y, the distance between the shapes 1933 and 1840 will be greater than the minimum same color spacing. As a result, the error path 1850 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the first hint represented by the markers 1930 and 1931, the user can select a selectable UI item 1885 (e.g., a button) to browse the next hint or select a selectable UI item 1886 to browse the last hint, i.e., the hint with the lowest priority value.

In the third stage 1915, the hint display area 1830 displays two markers 1935 and 1936 as a second layout-fixing hint for the error path 1850 after the user has selected the selectable UI item 1886 at the second stage 1910. In some embodiments, the marker 1935 indicates to the user of the EDA application that the shape 1938 needs to be moved up for a distance of x in order to fix the color-seeding violation. The marker 1936 indicates to the user that the shape 1933 needs to be moved down for a distance of y in order to fix the color-seeding violation. By moving the shape 1938 up for the distance of x and moving the shape 1933 down for the distance of y, the distance between the shapes 1933 and 1938 will be greater than the minimum same color spacing. As a result, the error path 1850 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the second hint represented by the markers 1935 and 1936, the user can select the selectable UI item 1885 to browse the next hint.

In the fourth stage 1920, the hint display area 1830 displays two pairs of markers 1940, 1941, and 1945, 1946 as a multi-link layout-fixing hint for the error path 1850 after the user has selected the selectable UI item 1886 at the third stage 1915. Because the hint represented by the markers 1940, 1941, 1945, and 1946 is a multi-link hint, it has lower priority than a regular hint. Thus this multi-link hint is the last hint to be shown for the error path 1850. In some embodiments, the markers 1840 and 1945 indicate to the user of the EDA application that the shape 1835 needs to be moved up for a certain distance in order to fix the color-seeding violation. The markers 1941 and 1946 indicate to the user that the shape 1943 needs to be moved down for a certain distance in order to fix the color-seeding violation. By moving the shape 1835 up and moving the shape 1943 down, the distances between the shapes 1835 and 1943 will be greater than the minimum same color spacing. As a result, the error path 1850 is broken and the color-seeding violation between the pre-colored nodes 1835 and 1840 is fixed.

Figure 20:
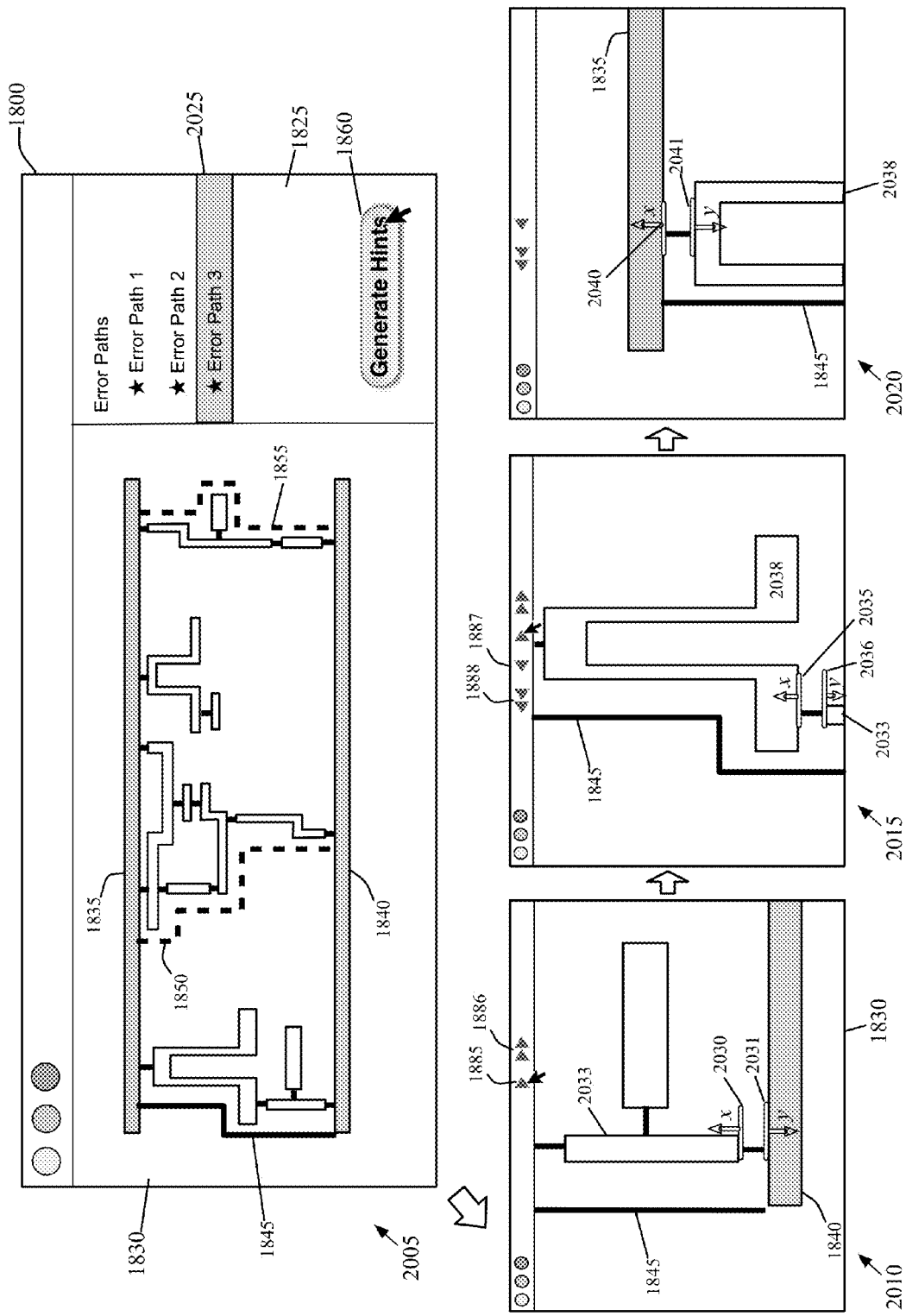
FIG. 20 illustrates the GUI of the EDA application that displays layout-fixing hints for a third error path.

FIG. 20 illustrates the GUI 1800 of the EDA application that displays layout-fixing hints for a third error path 1845. Specifically, this figure illustrates in four operational stages 2005-2020 how the GUI 1800 can be used to easily browse through generated layout-fixing hints for the third error path 1845. As illustrated in the figure, the error path shape 1845 is highlighted because its corresponding list item 2025 is selected in the error path list pane 1825, as indicated by the darkened list item 2025.

In the first stage 2005, the list item 2025 representing Error Path 3 is selected in the error path list pane 1825. As shown in the first stage 2005, the error path shape 1845 is highlighted in the hint display area 1830 because it corresponds to the selected list item 2025 in the error path list pane 1825. Now that the error path 1845 is selected, the user can select the generate-hints button 1860 to generate hints for the error path 1845. In some embodiments, the generated hints are sorted based on priority values assigned to them and will be displayed according to the results of the sorting. A hint with a higher priority value is displayed before a hint with a lower priority value.

In the second stage 2010, the hint display area 1830 displays two markers 2030 and 2031 as a first layout-fixing hint for the error path 1845 after the user has selected the generate-hints button 1860. In some embodiments, the marker 2030 indicates to the user of the EDA application that the shape 2033 needs to be moved up for a distance of x in order to fix the color-seeding violation. The marker 2031 indicates to the user that the shape 1840 needs to be moved down for a distance of y in order to fix the color-seeding violation. By moving the shape 2033 up for the distance of x and moving the shape 1840 down for the distance of y, the distance between the shapes 2033 and 1840 will be greater than the minimum same color spacing. As a result, the error path 1845 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the first hint represented by the markers 2030 and 2031, the user can select the selectable UI item 1885 to browse the next hint or select the selectable UI item 1886 to browse the last hint, i.e., the hint with the lowest priority value.

In the third stage 2015, the hint display area 1830 displays two markers 2035 and 2036 as a second layout-fixing hint for the error path 1845 after the user has selected the selectable UI item 1886 at the second stage 1910. In some embodiments, the marker 2035 indicates to the user of the EDA application that the shape 2038 needs to be moved up for a distance of x in order to fix the color-seeding violation. The marker 2036 indicates to the user that the shape 2033 needs to be moved down for a distance of y in order to fix the color-seeding violation. By moving the shape 2038 up for the distance of x and moving the shape 2033 down for the distance of y, the distance between the shapes 2033 and 2038 will be greater than the minimum same color spacing. As a result, the error path 1845 is broken and the color-seeding violation between the pre-colored nodes 1835 and 1840 is fixed. In some embodiments, the distances x and y are calculated by the hint feasibility checker 960 described above by reference to FIGS. 9 and 14-17. In some embodiments, one of the distances x and y can be zero while the other being a positive number. After browsing or processing the second hint represented by the markers 1935 and 1936, the user can select the selectable UI item 1885 to browse the next hint.

In the fourth stage 2020, the hint display area 1830 displays two markers 2040 and 2041 as a third layout-fixing hint for the error path 1845 after the user has selected the selectable UI item 1886 at the third stage 2015. In some embodiments, the marker 2040 indicates to the user of the EDA application that the shape 1835 needs to be moved up for a distance of x in order to fix the color-seeding violation. The marker 2041 indicates to the user that the shape 2038 needs to be moved down for a distance of y in order to fix the color-seeding violation. By moving the shape 1835 up for the distance of x and moving the shape 2038 down for the distance of y, the distances between the shapes 1835 and 2038 will be greater than the minimum same color spacing. As a result, the error path 1845 is broken and the color-seeding violation between the pre-colored nodes 1835 and 1840 is fixed.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
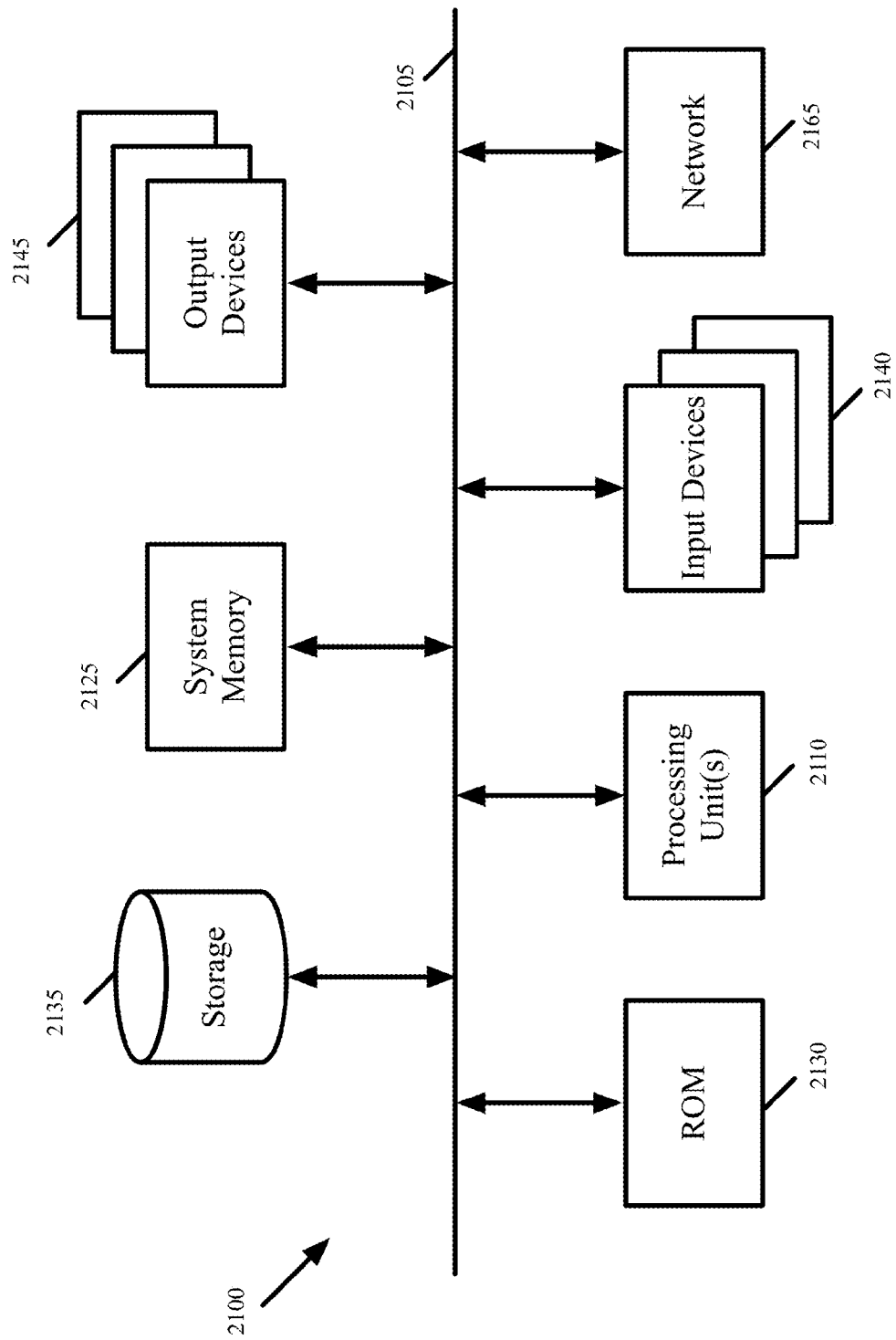
FIG. 21 conceptually illustrates an electronic system with which some embodiments of the invention are implemented.

FIG. 21 conceptually illustrates an electronic system 2100 with which some embodiments of the invention are implemented. The electronic system 2100 can be used to execute any of the control, virtualization, or operating system applications described above. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieves instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. For example, the various memory units include instructions for processing multimedia clips in accordance with some embodiments. From these various memory units, the processing unit(s) 2110 retrieves instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, while the examples shown illustrate splitting one or more shapes of a design layout region into two exposures, one of ordinary skill in the art would recognize that some embodiments would use similar processes to split shapes of a design layout region into more than two (e.g., three, four, etc.) exposures. One of ordinary skill in the art will also recognize that in some instances above, when referring to assigning shapes or portions of shapes to multiple exposures, the shapes (or portions thereof) are actually assigned to multiple mask layouts that are used to create multiple masks that enable a design layout layer to be printed in multiple exposures. Similarly, one of ordinary skill would recognize that while many instances above refer to "drawing" a graph, some embodiments do not actually draw the visible graph, but instead define the graph as a data structure.

In addition, a number of the figures (including FIGS. 11, 12, 15, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details.

What is claimed is:

1. A computer-implemented method for displaying design solutions for resolving assignment conflicts between shapes in a circuit design layout that are pre-assigned to different masks, the method comprising:
   receiving a set of paths for a disjoint set of shapes, each path comprising a set of links for connecting two pre-assigned shapes that have an assignment conflict, wherein each link is for connecting a pair of shapes that are within a threshold distance from each other;
   identifying a set of holes in a plurality of shapes and links of the disjoint set, wherein a hole is a space enclosed by a loop formed by shapes and links;
   for each of the received paths, performing an analysis on the path based on the set of identified holes to identify a set of design solutions that eliminates the assignment conflict on the path; and
   displaying the set of identified design solutions for each of the received paths in order to aid a user to resolve the assignment conflicts.

2. The method of claim 1, wherein displaying the set of identified design solutions comprises displaying a set of moving instructions for each design solution.

3. The method of claim 2, wherein the set of moving instructions provides a set of indications of a distance by which an edge of a shape needs to be moved in order to resolve an assignment conflict.

4. The method of claim 1, wherein a design solution does not introduce a new assignment conflict between two pre-assigned shapes.

5. The method of claim 1 further comprising:
   assigning a priority value to each of the identified design solutions; and
   sorting the set of identified design solutions for each of the received paths based on priority values assigned to the set of identified design solutions.

6. The method of claim 5, wherein displaying the set of identified design solutions comprises displaying the set of identified design solutions in an order that results from the sorting.

7. The method of claim 1, wherein the shapes of each pair of linked shapes are assigned to different masks.

8. The method of claim 1, wherein an assignment conflict exists when there are an odd number of links on a path between two pre-assigned shapes assigned to a same mask.

9. The method of claim 1, wherein an assignment conflict exists when there are an even number of links on a path between two pre-assigned shapes assigned to different masks.

10. The method of claim 1, wherein performing the analysis on the path based on the set of identified holes comprises:
    from the set of identified holes, retrieving all related holes that interact with at least one shape in the path; and
    for each link on the path:
        determining a relationship between the link and the related holes; and
        generating a design solution for breaking the link when the relationship satisfies a condition.

11. The method of claim 10, wherein the condition is satisfied when the link does not interact with any of the related holes.

12. The method of claim 10, wherein the condition is satisfied when the link (i) interacts with an error-path hole, (ii) does not interact with a non-error-path hole, and (iii) does not interact with a trivial hole, wherein a related hole is an error-path hole when the related hole interacts with both pre-assigned shapes connected by the path, a trivial hole when the related hole interacts with at most two shapes in the disjoint set of shapes, and a non-error-path hole when the related hole is not an error-path hole or a trivial hole.

13. The method of claim 10, wherein the condition is satisfied when the link (i) interacts with an error-path hole, (ii) does not interact with a non-error-path hole, and (iii) interacts with a trivial hole and a multi-link hint is identified between two shapes connected by the link, wherein a related hole is an error-path hole when the related hole interacts with both pre-assigned shapes connected by the path, a trivial hole when the related hole interacts with at most two shapes in the disjoint set of shapes, and a non-error-path hole when the related hole is not an error-path hole or a trivial hole.

14. The method of claim 13, wherein identifying the multi-link hint between the two shapes comprises:
    retrieving all links between the two shapes;
    determining whether there are at least two links between the two shapes; and
    when there are at least two links between the two shapes, identifying the multi-link hint when none of the links between the two shapes interacts with a non-error-path hole.

15. A system comprising:
    a processor for executing sets of instructions; and
    a memory for storing a computer program for displaying design solutions for resolving assignment conflicts between pre-assigned shapes in a circuit design layout, the program comprising sets of instructions for:
        receiving a set of paths for a disjoint set of shapes, each path comprising a set of links for connecting two pre-assigned shapes that have an assignment conflict, wherein each link is for connecting a pair of shapes that are within a threshold distance from each other;
        identifying a set of holes in a plurality of shapes and links of the disjoint set, wherein a hole is a space enclosed by a loop formed by shapes and links;
        for each of the received paths, performing an analysis on the path based on the set of identified holes to identify a set of design solutions that eliminates the assignment conflict on the path; and
        displaying the set of identified design solutions for each of the received paths in order to aid a user to resolve the assignment conflicts.

16. The system of claim 15, wherein the set of instructions for displaying the set of identified design solutions comprises a set of instructions for displaying a set of moving instructions for each design solution.

17. The system of claim 16, wherein the set of moving instructions provides a set of indications of a distance by which an edge of a shape needs to be moved in order to resolve an assignment conflict.

18. A non-transitory machine readable medium storing a program for displaying design solutions for resolving assignment conflicts between pre-assigned shapes in a circuit design layout, the program comprising sets of instructions for:

receiving a set of paths for a disjoint set of shapes, each path comprising a set of links for connecting two pre-assigned shapes that have an assignment conflict, wherein each link is for connecting a pair of shapes that are within a threshold distance from each other;

identifying a set of holes in a plurality of shapes and links of the disjoint set, wherein a hole is a space enclosed by a loop formed by shapes and links;

for each of the received paths, performing an analysis on the path based on the set of identified holes to identify a set of design solutions that eliminates the assignment conflict on the path; and displaying the set of identified design solutions for each of the received paths in order to aid a user to resolve the assignment conflicts.

19. The non-transitory machine readable medium of claim 18, wherein the program further comprises sets of instructions for:

assigning a priority value to each of the identified design solutions; and sorting the set of identified design solutions for each of the received paths based on priority values assigned to the set of identified design solutions.

20. The non-transitory machine readable medium of claim 19, wherein the set of instructions for displaying the set of identified design solutions comprises a set of instructions for displaying the set of identified design solutions in an order that results from the sorting.

21. The non-transitory machine readable medium of claim 18, wherein any two shapes in the disjoint set of shapes are connected to each other by at least one path.

\* \* \* \* \*